US00RE35883E

United States Patent [19]

Konieczynski

[11] E Patent Number: Re. 35,883

[45] Reissued Date of Patent: Sep. 1, 1998

[54] APPARATUS FOR DISPENSING CONDUCTIVE COATING MATERIALS INCLUDING COLOR CHANGING CAPABILITY

[75] Inventor: Ronald D. Konieczynski, North Royalton, Ohio

[73] Assignee: Nordson Corporation, Westlake, Ohio

[21] Appl. No.: 675,142

[22] Filed: Jul. 3, 1996

Related U.S. Patent Documents

Reissue of:

[64] Patent No.: 5,326,031
Issued: Jul. 5, 1994
Appl. No.: 961,156
Filed: Oct. 15, 1992

[51] Int. Cl.[6] ..... B05B 5/025

[52] U.S. Cl. ..... 239/3; 239/691; 239/695; 239/708

[58] Field of Search ..... 239/3, 690, 691, 239/695, 708; 118/302, 626, 629; 427/475, 483

[56] References Cited

U.S. PATENT DOCUMENTS

| | | | |
|---|---|---|---|
| 3,240,225 | 3/1966 | Barrows | 137/240 |
| 3,315,899 | 4/1967 | Quarve | 239/586 |
| 3,747,850 | 7/1973 | Hastings et al. | 239/3 |
| 3,895,748 | 7/1975 | Klingenberg | 222/571 |
| 3,906,122 | 9/1975 | Krause et al. | 239/3 X |
| 3,929,286 | 12/1975 | Hastings et al. | 239/3 |
| 3,937,400 | 2/1976 | Krause et al. | 239/3 X |
| 3,971,337 | 7/1976 | Hastings | 118/629 |
| 3,999,691 | 12/1976 | Doom | 222/330 |
| 4,004,717 | 1/1977 | Wanke | 222/255 |
| 4,017,029 | 4/1977 | Walberg | 239/695 |
| 4,020,866 | 5/1977 | Wiggins | 239/3 X |
| 4,053,012 | 10/1977 | Farmer | 222/571 X |
| 4,085,892 | 4/1978 | Dalton | 239/707 |
| 4,124,163 | 11/1978 | Siegmann | 239/533.15 |
| 4,142,707 | 3/1979 | Bjoklund | 251/77 |
| 4,275,834 | 6/1981 | Spanjersberg et al. | 239/3 |
| 4,313,475 | 2/1982 | Wiggins | 118/506 |
| 4,489,893 | 12/1984 | Smead | 239/691 |
| 4,544,570 | 10/1985 | Plunkett et al. | 427/475 |
| 4,629,119 | 12/1986 | Plunkett et al. | 239/3 X |
| 4,657,047 | 4/1987 | Kolibas | 137/881 |
| 4,660,598 | 4/1987 | Butterfield et al. | 137/510 |
| 4,771,729 | 9/1988 | Planert et al. | 118/697 |
| 4,792,092 | 12/1988 | Elberson et al. | 239/3 |
| 4,879,137 | 11/1989 | Behr et al. | 427/475 |
| 4,921,169 | 5/1990 | Tilly | 239/3 |
| 4,932,589 | 6/1990 | Diana | 239/3 |
| 5,078,168 | 1/1992 | Konieczynski | 137/566 |
| 5,094,389 | 3/1992 | Giroux et al. | 239/690 |
| 5,096,126 | 3/1992 | Giroux et al. | 118/629 X |
| 5,152,466 | 10/1992 | Matushita et al. | 239/708 X |

FOREIGN PATENT DOCUMENTS

| | | |
|---|---|---|
| 3725172 | 3/1987 | Germany . |
| 8705832 | 10/1987 | WIPO . |

*Primary Examiner*—Lesley D. Morris
*Attorney, Agent, or Firm*—Holland & Knight LLP

[57] ABSTRACT

An apparatus for transferring electrically conductive coating materials, such as water-based paint, from at least one source to one or more coating dispensers or spray guns for discharge onto a substrate includes two "parallel" flow paths, each having a large reservoir pump, which transmit coating material to a common valve which, in turn, switches flow to the coating dispensers from one flow path to the other. Each parallel flow path provides a voltage block between one or more sources of coating material and the electrostatically charged coating material discharged from the spray guns to ensure that there is never a completed electrical path between the source of conductive coating material and the charged coating material during a coating operation. Additionally, a rapid and efficient color change capability is provided for the entire system which permits different colored coating materials to be dispensed from the apparatus herein with minimum downtime of the coating operation.

67 Claims, 10 Drawing Sheets

APPARATUS FOR DISPENSING CONDUCTIVE COATING MATERIALS INCLUDING COLOR CHANGING CAPABILITY

Matter enclosed in heavy brackets [ ] appears in the original patent but forms no part of this reissue specification; matter printed in italics indicates the additions made by reissue.

RELATED PATENTS

This application is related to U.S. Pat. No. 5,078,168 to Konieczynski et al, issued Jan. 7, 1992, and entitled "Apparatus for Electrostatically Isolating and Pumping Conductive Coating Materials," which is owned by the assignee of this invention.

FIELD OF THE INVENTION

This invention relates to electrostatic spray coating, and, more particularly, to a method and apparatus for dispensing electrically conductive coating materials from one or more dispensers wherein the source of supply of the conductive coating material is electrostatically isolated from a high voltage electrostic power supply and wherein a change to different colored coating materials can be made rapidly and effectively.

BACKGROUND OF THE INVENTION

The application of coating materials using electrostatic spraying techniques has been practiced in industry for many years In these applications, the coating material is discharged in atomized form and an electrostatic charge is imparted to the atomized particles which are then directed toward a substrate maintained at a different potential to establish an electrostatic attraction for the charged atomized particles In the past, coating materials of the solvent-based variety, such as varnishes, lacquers, enamels and the like, were the primary materials employed in electrostatic coating applications. The problem with such coating materials is that they create an atmosphere which is both explosive and toxic The explosive nature of the environment presents a safety hazard should a spark inadvertently be generated, such as by accidentally grounding the nozzle of the spray gun, which can ignite the solvent in the atmosphere causing an explosion The toxic nature of the workplace atmosphere created by solvent coating materials can be a health hazard should an employee inhale solvent vapors As a result of the problems with solvent-based coatings, the recent trend has been to switch to water-based coatings which reduce the problems of explosiveness and toxicity. Unfortunately, this switch from electrostatically spraying solvent-based coatings to those of the water-based type has sharply increased the risk of electrical shock, which risk was relatively minor with solvent-based coatings The risk of electrical shock is occasioned in the use of water-based coatings due to their extreme electrical conductivity, with resistivities of such water-based coatings often falling within the range of 100 to 100,000 ohm centimeters. This is in contrast to resistivities of 200,000 to 100,000,000 ohm centimeters for moderately electrically conductive coatings such as metallic paint, and resistivities exceeding 100,000,000 ohm centimeters for solvent-based lacquers, varnishes, enamels and the like.

The relative resistivity of the coating material is critical to the potential electrical shock which may arise during an electrostatic coating operation. With coating materials which are either not electrically conductive or only moderately electrically conductive, the column of coating material which extends from the charging electrode at the tip of the coating dispenser through the hoses leading back to the supply tank has sufficient electrical resistance to prevent any significant electrostatic charging of the material in the supply tank or the tank itself However, when coating material is highly electrically conductive, as are water-based coatings, the resistance of the coating column in the supply hose is very low. As a result, a high voltage charging electrode located in the vicinity of the nozzle of the coating dispenser electrostatically charges not only the coating particles, but the coating material in the hose, the coating material in the supply tank and the supply tank itself. Under these circumstances, operating personnel inadvertently coming into contact with an exposed supply tank, or a charged hose, or any other charged part of the system, risk serious electrical shock unless such equipment is grounded to draw off the electricity. If the equipment is indeed grounded at any point, however, the electrostatics will not function because the high voltage charge would be conducted away from the coating dispenser electrode to the grounded point as well.

One of the methods and apparatus for reducing the electrical shock problem is disclosed, for example, in U.S. Pat. No. 4,313,475 to Wiggins. In apparatus of this type, a "voltage block" system is employed wherein an electrostatically conductive coating material is first transmitted from a grounded primary coating supply into a transfer vessel which is electrically isolated from one or more electrostatic coating dispensers. After being filled with coating material, the transfer vessel is first disconnected from the primary coating supply and then connected to an inventory tank, which, in turn, is connected to the coating dispensers. The coating material is transmitted from the transfer vessel into the inventory tank, with the transfer vessel disconnected from the primary coating supply, to fill the inventory tank with coating material for subsequent transfer to the coating dispensers. After the inventory tank is filled, the transfer vessel is disconnected from the inventory tank and connected back to the primary coating supply to receive another quantity of coating material so that the coating operation can proceed essentially continuously.

Another "voltage block" system for transferring electrically conductive coating materials is disclosed in U.S. Pat. No. 5,078,168, which is owned by the assignee of this invention. In this system, first and second shuttle devices are selectively connected to two large reservoir, piston pumps. The first shuttle device is movable between a transfer position, and a spaced, neutral position, relative to a filling station which is connected to a source of electrically conductive coating material. At the filling station, the first shuttle is operative to transfer coating material from the source into the reservoir of the first pump. In the neutral position, the first shuttle is electrically isolated, i.e., physically spaced, from the filling station. The second shuttle device is movable between a transfer position wherein it interconnects the first piston pump with the second piston pump, and a neutral position wherein the two pumps are electrically isolated from one another and the second piston pump supplies coating material to the dispensers. Movement of the shuttles is controlled to maintain one of the shuttles in a neutral position while the other is at the transfer position so that there is never a completed electrical path between the source of electrically conductive coating material and the electrostatically charged dispenser.

One problem with apparatus of the type disclosed in U.S. Pat. Nos. 4,313,475 and 5,078,168 involves the pressure available to discharge the coating material from either the transfer vessel of the Wiggins apparatus or the second reservoir above the Konieczynski apparatus. For example, in the Konieczynski apparatus, each of the first and second reservoir pumps includes a piston which is movable in one direction in response to the application of air pressure thereagainst to discharge coating material from the reservoir, and is movable in the opposite direction as new coating material is added to the reservoir. In order to permit filling of the reservoir of the second pump with coating material supplied from the first pump, the air pressure applied to the piston in the second pump must be reduced compared to that of the first pump, otherwise the piston within the second pump would not move and allow the reservoir therein to be filled. Because of this reduced pressure level within the second pump, the coating material is discharged therefrom at a relatively low pressure level. As a result, a comparatively few coating dispensers can be supplied with coating material, and the spray pattern emitted from such dispensers is not always stable.

Another problem with voltage block systems of the type described above, and particularly the Konieczynski apparatus disclosed in U.S. Pat. No. 5,078,168, is a relatively wide pressure fluctuation in the coating material discharge from the second pump to the coating dispensers. When the reservoir of the second pump is filled and coating material is discharged by its piston moving in a downward direction toward the base of the reservoir, the fluid pressure output from the second pump is less than the air pressure at which the piston is forced downwardly because the seal friction with which the piston seals against the side walls of the pump reservoir opposes downward motion of the piston. This produces a comparatively low fluid discharge pressure, significantly lower than the air pressure, with the attendant disadvantages noted above. On the other hand, a higher fluid discharge pressure, e.g. higher than the air pressure, is output from the second pump when it is filled with coating material from the first pump. This is because the fluid pressure of the coating material introduced at the base of the second pump, on the bottom side of the piston, must overcome both the air pressure acting on the opposite or top side of the piston and the seal friction of the piston seals against the sidewall of the piston reservoir. Since the air pressure in the system remains constant, the fluid pressure fluctuates depending on whether the piston within the second pump is moving upwardly or downwardly. Accordingly, a potentially large pressure fluctuation can occur at the discharge side of the second pump depending upon whether or not the second pump is undergoing a fill cycle or a discharge cycle when coating material is discharged therefrom to the coating dispensers. Such pressure fluctuation limits the number of dispensers which can be supplied by the second pump, and/or adversely affects the spray pattern obtained from such dispensers.

Another problem with apparatus of the type disclosed in U.S. Pat. Nos. 4,313,475 and 5,078,168 is that an appreciable pressure drop is produced when water, solvent and/or air is used to flush the system of paint of one color in preparation for the use of another colored paint. This pressure drop occurs because, as noted above, all of the hoses and transfer containers or pumps are interconnected in series with one another from the point at which the source of coating material is introduced into the system to the point at which the coating material is discharged to the coating dispensers. For example, in the system of U.S. Pat No. 5,078,168, the coating material, flushing liquid and/or air must first enter the lines interconnecting the first shuttle to the first pump, travel through the line interconnecting the first pump to the second pump and then pass through the lines interconnecting the second pump to the coating dispenser. By the time the flushing fluid or coating material reaches the downstream portions of this flow path, a pressure drop has occurred which lessens the effectiveness with which the air or liquid can remove the coating material remaining in the system.

Wile both of the systems disclosed in the Wiggins Patent No. 4,313,475 and Konieczysnki Patent No. 5,078,168 are adapted for use with color changers connected to sources of different color paint, neither system is capable of effecting a color change rapidly in a production environment. Both of these systems provide an essentially "series" flow path between the source(s) of coating material and the dispensers. That is, the coating material is first transmitted from the source to the transfer vessel of the Wiggins apparatus, or to the first reservoir pump of the Konieczynski apparatus, and then delivered through lines to either the inventory tank or second reservoir pump for subsequent supply to the dispensers. In order to effect a color change in either system, a flushing liquid such as water must be introduced at the beginning of this flow path, i.e., where the coating material is introduced, and then pass through each line and element of the system in sequence, one after the other, to remove the old paint. In applications such as the coating of automobiles and/or other assembly line-type painting operations, such a relatively long "downtime" between color changes is unacceptable.

SUMMARY OF THE INVENTION

It is therefore among the objectives of this invention to provide a method and apparatus for dispensing electrically conductive coating materials, such as water-based paint, which protects against the transmission of an electrostatic charge between a high voltage electrostatic power supply and one or more primary coating supplies, which is capable of supplying a large number of coating dispensers, which avoids pressure fluctuations during operation, which produces a consistent, acceptable spray pattern of coating material on a substrate, and, which is capable of permitting rapid and efficient changes between coating materials of different color.

These objectives are accomplished in an apparatus for transferring electrically conductive coating materials, such as water-based paint, from at least one source to one or more coating dispensers or spray guns for discharge onto a substrate. The electrically conductive coating material is transmitted from two "parallel" flow paths, each having a large reservoir pump, to a common valve which switches flow to the coating dispensers from one flow path to the other. Each parallel flow path provides a voltage block, i.e., an air gap, between one or more sources of coating material and the electrostatically charged spray guns. This voltage block ensures that there is never an identical path between the source of conductive coating material and the charged coating material during a coating operation Additionally, a rapid and efficient color change capability is provided for the entire system which permits different colored coating materials to be dispensed from the apparatus herein with minimum downtime of the coating operation.

One aspect of this invention is predicated upon the concept of replacing the "series" flow path arrangement found in the prior art with at least two "parallel" flow paths, each connected between one or more sources of coating material and the coating dispensers. The parallel flow path system of this invention eliminates the long, difficult-toclean series flow paths employed in prior art systems of the type described above. In this invention, each flow path comprises a voltage block construction which includes a transfer device having a filling station connected to the source(s) of coating material, a discharge station spaced from the filling station and a shuttle movable between and releasably coupled to the filling station and discharge station. Upon movement of the shuttle to the filling station of the transfer unit, the shuttle is effective to transfer coating material from the source into the reservoir of a piston pump associated with such flow path. When the reservoir of the piston pump is filled, the shuttle moves and is coupled to the discharge station wherein a connection is made allowing the coating material to be transferred from the pump through the discharge station of the transfer unit and into a "sync" valve connected to the dispensers. This sync valve is common to both flow paths and is effective to switch the flow of coating material to the dispensers from one flow path to the other.

The operation of the system is synchronized such that when the pump of one flow path is supplying coating material to the dispensers, the pump of the other flow path is receiving coating material from the source. A voltage block is continuously maintained between the source and charged dispensers, and the dispensers can be essentially continuously supplied with coating material from one or the other of the parallel flow paths. Because each of the parallel flow paths are essentially separate from one another, the coating material is transmitted along a relatively short distance to the dispensers thus making cleaning of such flow path relatively fast and efficient compared to prior art systems. Additionally, because a separate pump is associated with each flow path, a higher pressure is available to transmit coating material to the dispensers than is obtained with prior art systems, thus enabling (1) more dispensers to be supplied with coating material at the same pressure, or (2) a higher flow of material to be transmitted to the dispensers, or (3) longer transfer lines to be used between the pumps and dispensers. Further, the essentially direct supply of coating material from a separate pump associated with each flow path to the coating dispensers substantially eliminates pressure fluctuations present in other voltage block systems. As a result, an improved spray pattern is obtained from the dispensers associated with the system of this invention.

Another advantage of employing parallel flow paths, each with a separate pump, is that pump wear and/or seal failure is substantially reduced compared to other voltage block systems for the same flow volume. In the Konieczynski et al. system, for example, the second reservoir pump would be required to stroke twice as often as each individual pump associated with the two flow paths of this system to deliver the same quantity of coating material to the dispensers. Additionally, the shuttles associated with both the first and second reservoir pumps of the Konieczynski apparatus are required to operate twice as often as the shuttle of each parallel flow path herein. As a result, a significant reduction in wear of the pumps and shuttles of this system is obtained compared to prior voltage block apparatus such as disclosed in U.S. Pat No. 5,078,168.

The apparatus of this invention also includes structure for efficiently cleaning each of the parallel flow paths wherein essentially all portions thereof are flushed simultaneously, first with water and then with air, in order to speed the color change process. As described in detail below, the lines interconnecting the pumps with the common sync valve are flushed at the same time that the lines interconnecting the source and transfer units are flushed. And these flushing operations are carried out essentially independently of one another so that the flow of flushing fluid, e.g., water and/or air, travels along a relatively short flow path in the course of each flushing operation. Accordingly, the speed at which the apparatus herein can be completely cleaned is greatly increased compared to prior art systems wherein each element had to be cleaned of coating material in sequence, one after the other, as the flushing material flowed therethrough.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
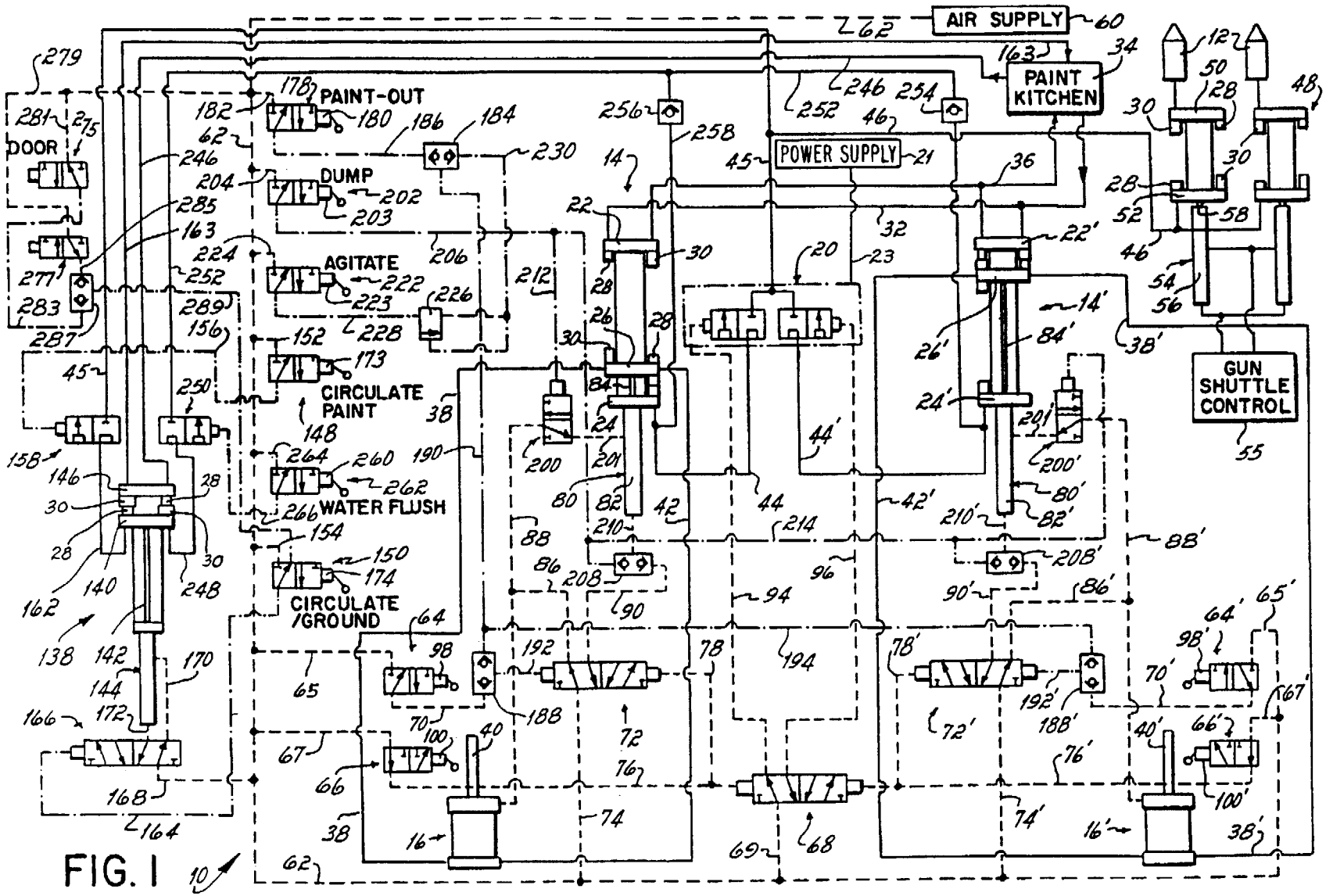
FIG. 1 is an overall schematic view of the parallel flow system for transmitting electrically conductive coating material of this invention.
Figure 8:
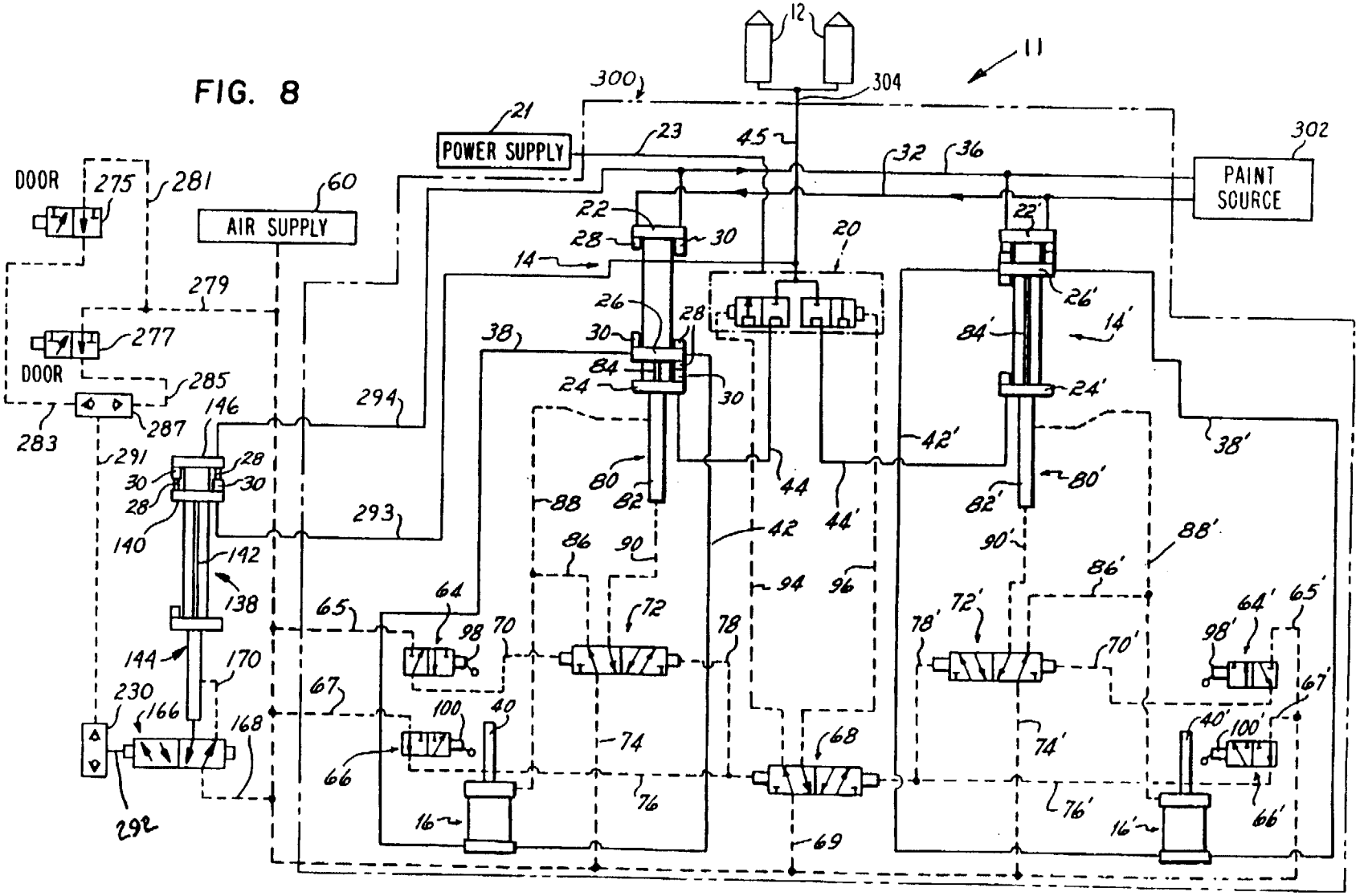
FIG. 8 is a schematic depiction of an alternative embodiment of the apparatus of this invention.
Figure 9:
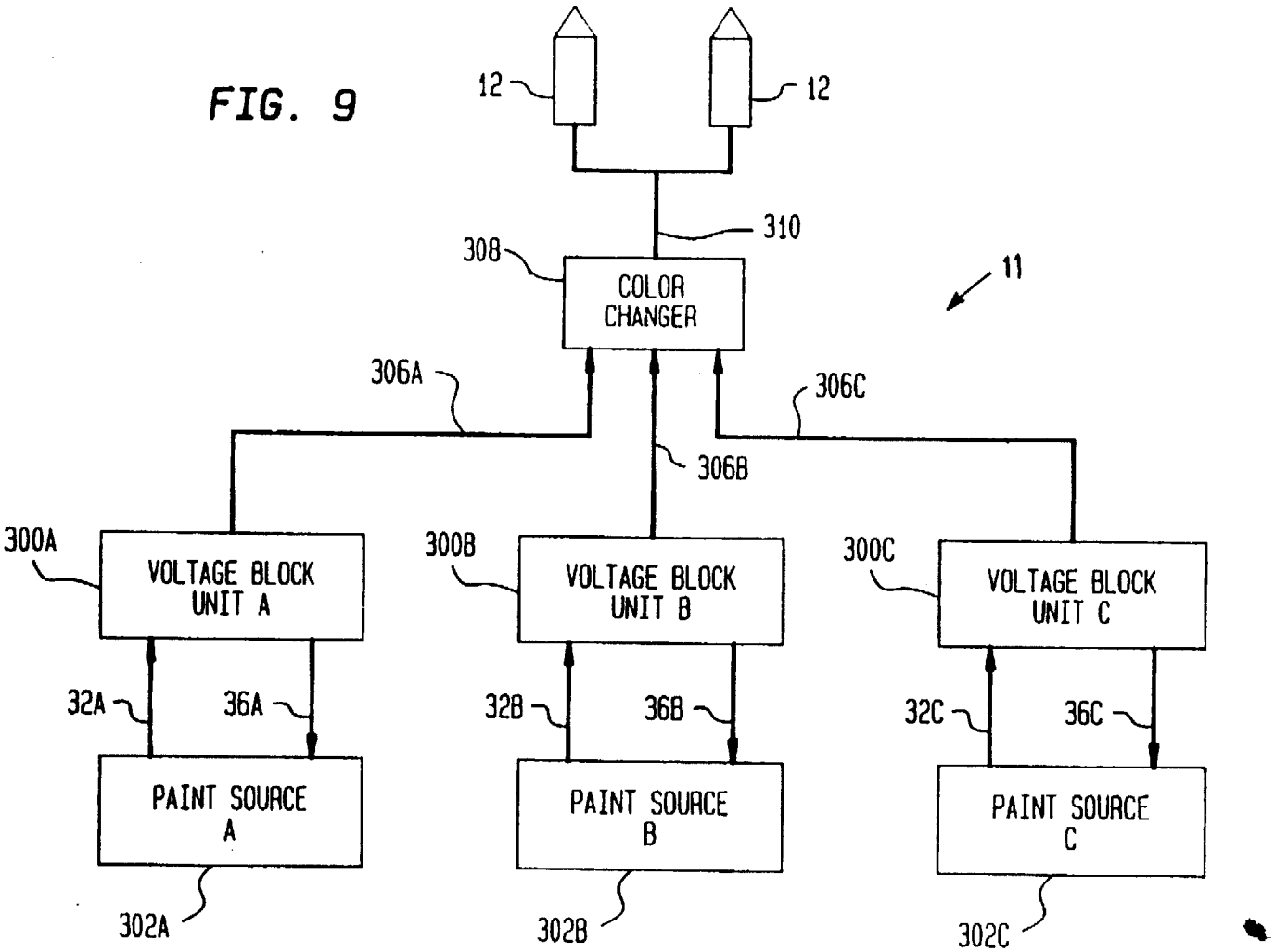
FIG. 9 is a schematic, block diagram of the embodiment illustrated in FIG. 8 in which three apparatus are shown in parallel, each connected to a source of different colored paint.

Referring initially to FIG. 1, one embodiment of the parallel flow system 10 of this invention is schematically illustrated. The system 10 includes structure for delivering electrically conductive coating material to one or more spray guns or rotary atomizers 12 while maintaining a "voltage block" or air gap between the source(s) of coating material and such spray guns 12. Preferably, the spray devices 12 are spray guns of the type sold by Nordson Corporation, of Westlake, Ohio, the assignee of this invention, under Model No. AN-9, or rotary atomizers sold by Nordson Corporation under Model No. RA-12. In order to facilitate understanding of the invention, the system 10 depicted in FIG. 1 is simplified in FIGS. 2–7 wherein the structure necessary to perform specific operations of the system 10 is illustrated and the remaining structure is omitted. The system 10 is therefore described separately below with reference to each individual Fig., and then a complete color changing operation is discussed which combines many of the individual operations. The structure and operation of flow system 11, illustrated in FIGS. 8 and 9, is then described.

NORMAL SYSTEM OPERATION

Figure 1A:
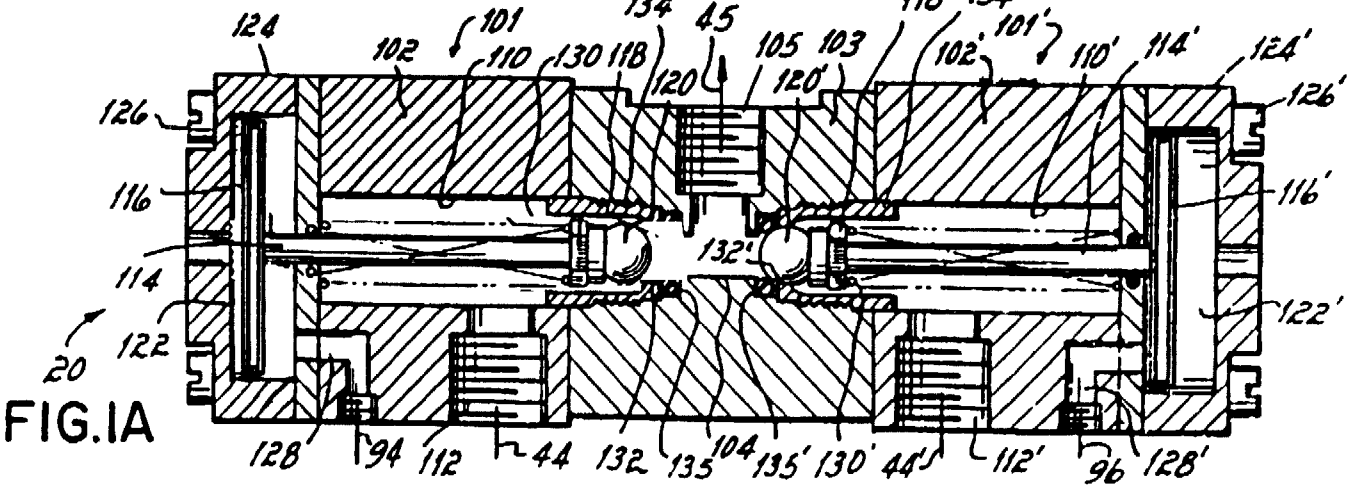
FIG. 1A is a partial cross sectional view of the common, sync valve of this invention.
Figure 2:
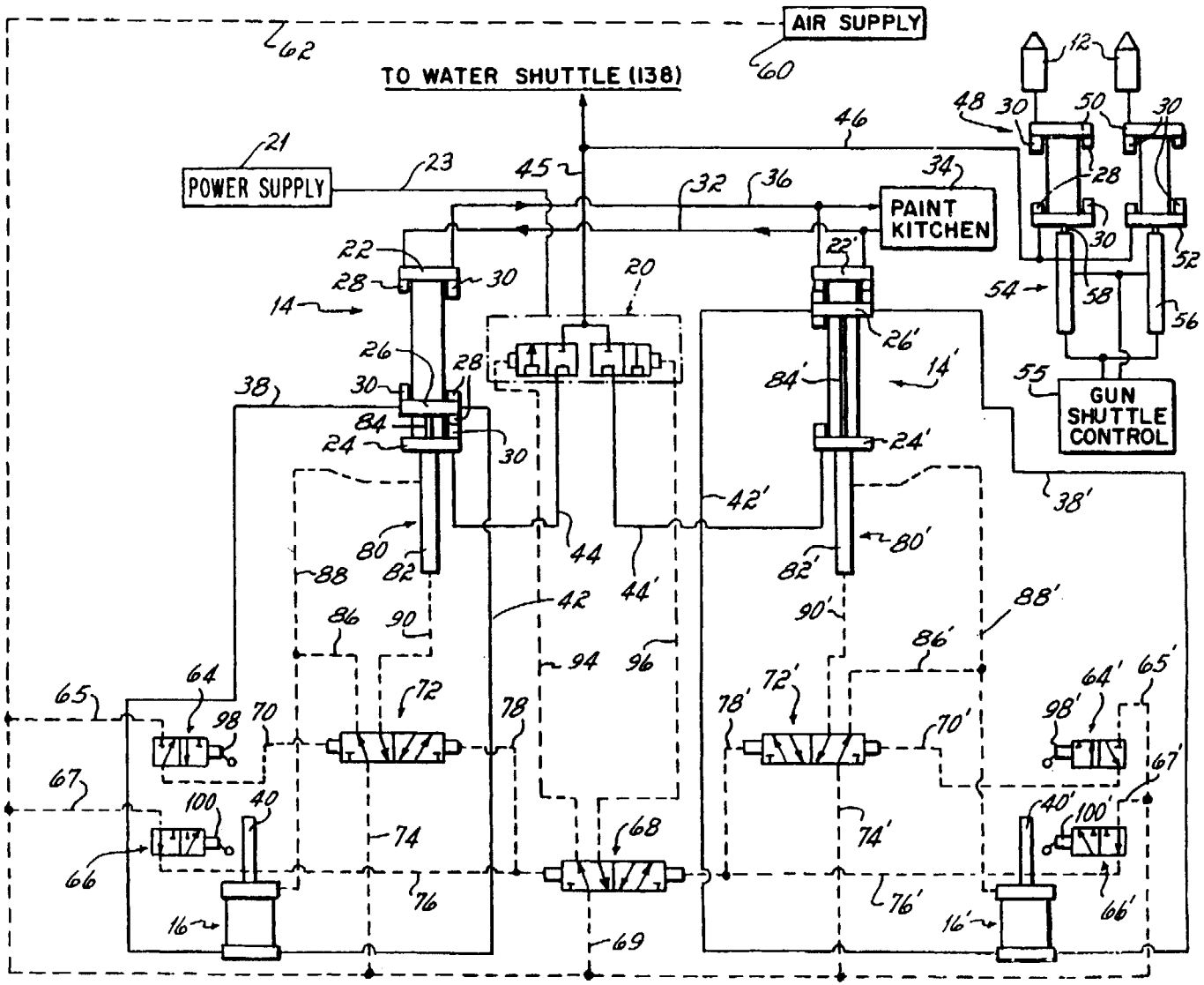
FIG. 2 is a schematic depiction of that portion of the system of FIG. 1 which operates during normal operating conditions.

With particular reference to Figs. 1A and 2, that portion of the system 10 which is required to supply coating material to the spray guns 12 during normal operation is illustrated. The "normal operating" portion of system 10 comprises two essentially identical, parallel flow paths each comprising a transfer unit 14, a piston pump 16 and a valving system for operating the transfer unit 14 and piston pump 16. The parallel flow paths employ a common four-way valve and a common "sync" valve 20, both of which are described in detail below. As viewed in FIG. 2, one of the parallel flow paths is located on the lefthand side of the sheet in relation to the common sync valve 20, whereas the other, parallel flow path is located on the righthand side of the sheet therefrom. For purposes of the present discussion, the flow path on the lefthand side of the sheet of FIG. 2 is described in detail, it being understood that the structure and operation of the other flow path is identical. Reference numbers utilized to describe structure on the lefthand side of FIG. 2 are employed to denote the same structure on the righthand side thereof with the addition of a "prime."

The transfer unit 14 comprises a filling station 22, a discharge station 24 and a shuttle 26 movable between the filling and discharge stations 22, 24. The filling station 22 is provided with male and female coupling elements 28, 30 which mate with male and female coupling elements 28, 30 carried by the shuttle 26. Preferably, these coupling elements 28, 30 are of the type disclosed in U.S. Pat. No. 5,078,168 to Konieczynski et al, owned by the assignee of this invention, the disclosure of which is incorporated by reference in it entirety herein.

As depicted in FIG. 2, electrically conductive coating material is supplied through a paint supply line 32 to the male coupling element 28 at the filling station 22 from a "paint kitchen" 34. This paint kitchen 34 includes appropriate paint pumps, water flushing pumps and a color changer (not shown), the detailed disclosure of which forms no part of this invention and is therefore not discussed herein. A color changer of the type such as disclosed in U.S. Pat. No. 4,657,047 to Kolibas, owned by the assignee of this invention, is utilized in the paint kitchen 34 which supplies different colors for discharge by the spray guns 12 in the manner described below. The female coupling element 30 of the filling station 22 is connected by a return line 36 to the paint kitchen 34

In the presently preferred embodiment, the shuttle 26 is movable into coupling engagement with the filling station 22 such that the female coupling element 30 at the top of shuttle 26 mates with the male coupling 28 of the filling station 22, and the male coupling 28 of shuttle 26 mates with the female coupling element 30 of filling station 22. The female coupling element 30 of shuttle 26 is connected by a transfer line 38 to the inlet side of the piston pump 16 which is preferably of the type disclosed in U.S. Pat No. 5,078,168. This piston pump 16 includes a large reservoir (not shown) and a piston rod 40 which extends outwardly from the pump interior. The outlet side of piston pump 16 is connected by a second transfer line 42 to the shuttle 26 in position to transmit coating material to the male coupling element 28 at the top of the shuttle 26 and a male coupling element 28 at the bottom thereof. This male coupling element 28 at the base of shuttle 26 is matable with a female coupling element 30 carried by the discharge station 24 of transfer unit 14. A discharge line 44 interconnects the female coupling element 30 at the discharge station 24 with one side of the sync valve 20 which is described below.

The outlet of the sync valve 20 is connected to a circulation line 45 which is described in more detail below in connection with a discussion of FIG. 3. In turn, the circulation line 45 is intersected by a gun supply line 46 which leads to a number of separate gun shuttles 48 each connected to one of the spray guns 12. In the presently preferred embodiment, the gun shuttles 48 each comprise a discharge station 50 having male and female coupling elements 28, 30, and a filling station 52 having mating, male and female coupling elements 28, 30. The filling station 52 is mounted to a linear actuator 54 having a cylinder 56 and a reciprocating piston 58 which is connected to the filling station 52. In response to operation of actuator 54, the filling station 52 is moved into and out of engagement with the discharge station 50 such that the coupling elements thereof mate with one another. The actuators 54 of gun shuttles 48 are controlled by a control system 55 (FIG. 1) described in detail in U.S. patent application Ser. No. 07/766,796, filed Sep. 27, 1991, entitled "Apparatus For Dispensing Conductive Coating Material" which is owned by the assignee of this invention and the disclosure of which is incorporated by reference in its entirely herein. The detailed structure and operation of such control system forms no part of this invention and thus is not described herein, except it is noted that movement of the filling station 52 occurs when a dispenser 12 is actuated, such as by depressing the trigger.

It should be understood that the gun shuttles 48 and control system 55 are employed only with manually operated dispenser 12. In applications utilizing automatic dispensers, a controller (not shown) associated with the paint kitchen 3 is effective to turn the dispensers 12 on and off and the supply line 46 is connected directly to each dispenser 12.

The operation of transfer unit 14, piston pump 16 and sync valve 20 is controlled by a series of air-operated valves which are responsive to the quantity of coating material within the piston pump 16, as described below. Referring to the top portion of FIG. 2, pressurized air is supplied from an air source 60 through a primary air supply line 62 to an upper limit valve 64 via tap line 65, a lower limit valve 66 via tap line 67 and a common, four-way valve 68 via tap line 69. Preferably, the valves 64, 66 and 68 are of the type made by Clippard Laboratory, Inc. of Cincinnati, Ohio under Model Nos MJV-3, MJVO-3 and MJV-4D, respectively. The upper limit valve 64 is connected by a pilot line 70 to the left side of a four-way valve 72 as depicted in FIG. 2, which, in turn, is supplied with pressurized air from a tap line 74 connected to the primary supply line 62. Valve 72 is the same type of valve as valve 68. The lower limit valve 66 is connected by a pilot line 76 to the left side of the four-way valve 68, and by a separate pilot line 78 to the opposite, righthand side of four-way valve 72.

The four-way valve 72 controls the operation of a linear actuator 80 associated with the transfer unit 14. This linear actuator 80 includes a cylinder 82 having a piston 84 connected to the shuttle 26 of transfer unit 14. In response to operation of the actuator 80, the piston 84 moves the shuttle 26 between a discharge position coupled to the discharge station 24 as shown on the lefthand side of FIG. 2, and a pump filling position coupled to filling station 22 such as shown on the righthand side of FIG. 2 wherein shuttle 26' and filling station 22' are coupled to one another. In order to control operation of linear actuator 80, the four-way valve 72 is connected to a line 86 which intersects an operating line 88 extending between the top portion of linear actuator 80 and the piston pump 16. The four-way valve 72 is also connected by a pilot line 90 to the bottom of linear actuator 80, for purposes to become apparent below.

With reference to the center portion of FIG. 2, the four-way valve 68 is connected by a first pilot line 94 to the lefthand side of sync valve 20, and a second pilot line 96 extends from the four-way valve 68 to the opposite, right-hand side of sync valve 20. As noted above, the four-way valve 68 is common to both of the parallel flow paths herein, and, hence, the opposite or righthand side of four-way valve 68 is connected by pilot line 76' from the lower limit valve 66'.

Operation of the parallel flow paths of this invention as depicted in FIG. 2 is predicated upon the concept of first supplying coating material to the spray guns 12 from the piston pump 16 associated with one flow path, and then supplying coating material from the piston pump 16, associated with the other flow path. While the piston pump 16 is discharging coating material to the spray guns 12, the piston pump 16' is being filled with fresh paint from the paint kitchen 34. By the time the piston pump 16 is empty, the other piston pump 16' has been completely filled and can be operated to supply paint to the spray guns 12 via the sync valve 20. The body of sync valve 20 is formed of metal or other electrically conductive material which is connected to a high voltage electrostatic source 21 by an electrical line 23. In the course of passage through the sync valve 20, the electrically conductive coating material receives an electrostatic charge and said charged coating material is then supplied via lines 45 and 46 to the dispensers 12. Regardless of which piston pump 16 or 16, supplies coating material to the spray guns 12, an air gap or voltage block is continuously maintained between the paint kitchen 34 and spray guns 12 to avoid the transmission of a high voltage electrostatic charge via the coating material therebetween.

For purposes of the present discussion, assume piston pump 16 has already been "primed" or filled with coating material at the outset of operation of system 10. In such instance, the piston rod 40 associated with piston pump 16 is in an uppermost, raised position relative to the upper and lower limit valves 64, 66 because the reservoir of piston pump 16 is filled. In the course of moving to such uppermost position, the piston rod 40 trips the switch 98 associated with upper limit valve 64 thus permitting pilot air to flow through the upper limit valve 64 and pilot line 70 to the four-way valve 72. In turn, the spool of four-way valve 72 shifts to the position shown in FIG. 2 wherein a flow of air from branch line 74 is permitted to pas through the four-way valve 72 into the line 86. The pressurized air enters operating line 88 where it flows upwardly as depicted in FIG. 2 to pilot the linear actuator 80, and downwardly to force the piston of piston pump 16 toward the bottom of its reservoir. In response to the receipt of pilot air from line 88, the piston 84 of linear actuator 80 moves the shuttle 26 downwardly into mating engagement with the discharge station 24 of transfer unit 14. As a result, the second transfer line 42 extending between the piston pump 16 and shuttle 26 is interconnected via the filling station 22 with the discharge line 44 connected to sync valve 20. As the piston within piston pump 16 is forced downwardly under the influence of the air flow from line 88, the coating material therein is forced from the piston pump 16 along the flow path defined by second transfer line 42, shuttle 26, discharge station 24 and discharge line 44 to the sync valve 20.

As described below in connection with a discussion of FIG. 1A, the sync valve 20 is operative to receive coating material from either of the piston pumps 16 or 16' and deliver such coating material via circulation line 45 and gun supply line 46 to the gun shuttles 48 associated with each spray gun 12. As noted above, the operation of such gun shuttles 48 is controlled by a separate control system which is fully described in U.S. patent application Ser. No. 07/766,796. Under normal operating circumstances, the filling station 52 of each gun shuttle 48 is interconnected with the discharge station 50 thereof in response to activation of the associated spray gun 12, such as by pulling the trigger of a mutually operated gun. When the discharge and filling stations 50, 52 are coupled with one another, the flow of coating material from the sync valve 20, circulation line 45 and gun supply line 46 passes through such gun shuttles 48 to each activated spray gun 12 which deposits the coating material onto the target substrate. In the event any one or all of the spray guns 12 are deactivated, the discharge and filling stations 50 and 52 of the respective gun shuttle 48 disconnect from one another thus halting the flow of coating material into spray guns 12. As mentioned above, while one of the piston pumps 16 or 16' provides coating material to sync valve 20, the other piston pump is being filled with coating material. The pump filling operation proceeds as follows. After a period of time, the coating material within the reservoir of piston pump 16 becomes depleted and its piston rod 40 gradually moves downwardly within the pump reservoir. Upon reaching a predetermined lowermost position, the piston rod 40 releases the switch 100 associated with the lower limit valve 66. This closes lower limit valve 66 and permits the flow of pilot air through pilot line 76 to one side of the common four-way valve 68, and through second pilot line 78 to the righthand side of four-way valve 72. Such flow of pilot air initiates two operations within the system 10, which proceed at different speeds. First, the pilot air flowing through pilot line 76 shifts the position of the pool within four-way valve 68 so that operating air from primary supply line 62 and tap line 69 can flow through the common four-way valve 68 into the second pilot line 96. As described in more detail below, the pilot air from second pilot line 96 causes the side of sync valve 20 connected to discharge line 44' to immediately open while the discharge line 44, which had been transmitting coating material from pump 16, is allowed to close. Coating material is then supplied from the piston pump 16' in the same manner as described above in connection with piston pump 16. Lagging behind this operation of sync valve 20 is the movement of shuttle 26 created by the pilot air flowing through pilot line 78. As noted above, pilot line 78 is connected to the side of four-way valve 72 opposite the pilot line 70 associated with upper limit switch 64. The pilot air from pilot line 78 shifts the spool within four-way valve 72 so that operating air from branch line 74 flows through the four-way valve 72 into the pilot line 90 connected to the bottom of the linear actuator 80 associated with transfer unit 14. This pilot air causes the piston 84 of linear actuator 80 to extend and move the shuttle 26 upwardly into mating engagement with the filling station 22, i.e., in the position of shuttle 26' shown on the righthand side of FIG. 2. With the shuttle 26 in this position, coating material from the paint kitchen 34 is supplied through paint supply line 32 and filling station 22 to the transfer line 38 connected to piston pump 16. The piston pump 16 therefore receives fresh paint from the paint kitchen 34 and its piston rod 40 begins to move upwardly as discussed below.

SYNC VALVE

An important aspect of this invention is that the spray guns 12 can be provided with an essentially continuous supply of coating material because of the cooperation of the separate, parallel flow paths on the left and righthand sides of FIG. 2 which are both connected to the sync valve 20.

With reference to FIG. 1A, the construction of the sync valve 20 makes possible a shift of supply of coating material from one piston pump 16 to the other piston pump 16' without any interruption in the flow of coating material to the spray gun 12. The sync valve 20 consists of a pair of air-open, spring-return ball valves 101 and 101' each having a valve body 102, 102', respectively. The valves 101, 101' are connected to a central mounting block 103 formed with a throughbore 104 which is intersected by an outlet 105 connected to the circulation line 45. The valves 101, 101, which form sync valve 20 are structurally and functionally identical, and therefore only the valve 101 is described in detail and with the same reference numbers being used with the addition of a "prime" to denote the structure of valve 101'.

As viewed on the lefthand side of FIG. 1A, the valve body 102 of valve 101 is formed with a bore 110 which intersects an inlet port 112 connected to the discharge line 44 associated with piston pump 16. This bore 110 receives a rod 114 connected at one end to a piston 116 and at the opposite end to a collar 118 which mounts a ball 120. The piston 116 is movable within a chamber 122 formed in a two-piece end cap 124 mounted to one end of the valve body 102 by screws 126 which extend through the valve body 102 into the central mounting block 103. An air passage 128 is formed in the valve body 102 and end cap 124 which transfers pilot air from the first pilot line 94 against one side of the piston 116. Preferably, a spring 130 extends between the end cap 124 and the collar 118 to urge the ball 120 against the seat 132 of an insert 134 which is threadedly received within one end of the throughbore 104 of central mounting block 103 and rests against a flange 135 formed therein.

Coating material from the discharge line 44 is introduced through the inlet port 112 into the bore 110 where it flows to the ball 120. In response to the supply of pilot air via line 94, the piston 116 is moved to the left as viewed in FIG. IA which unseats the ball 120 from seat 132 thus allowing flow of coating material into the throughbore 104 Of valve body 102 and out its outlet 105 into circulation line 45.

The operation of sync valve 20 is controlled by the common, four-way valve 68 such that flow of coating material from only one of the piston pumps 16 or 16' is permitted at any given time, except for a brief period during which flow of the coating material shifts from an empty piston pump 16 or 16' to the other pump. As mentioned above, air valves 64, 66 and 72 control the operation of the linear actuator 80 associated with the transfer unit 14. When the piston pump 16 is nearly empty and lower limit valve 66 is tripped, four-way valve 72 is piloted to permit an air flow to the bottom of linear actuator 80 as described above. This causes the shuttle 26 to disengage the discharge station 24 of transfer unit 14 and move toward the filling station 22. But the operation of lower limit valve 66, four-way valve 72 and actuator 80 is slower than that of the four-way valve 68 and sync valve 20. Before the shuttle 26 can disengage the discharge station 24, the sync valve 20 has already shifted position, i.e., pilot air has been supplied via line 76 to the common four-way valve 68 which, in turn, allows air flow through second pilot line 96 to the sync valve 20. This immediately causes the ball 120' to move away from its seat 132' and thus initiate the flow of coating material into the throughbore 104 of sync valve 20 from the piston pump 16'. Such movement of the ball 120' occurs before the shuttle 26 can disengage from the discharge station 24 and before ball 120 completely seals against seat 132. As a result, as ball 120' is withdrawing and ball 120 is closing, the piston pump 16 continues to supply at least some coating material through the discharge line 44 connected to the lefthand side of sync valve 20 so that there is always coating material flowing through the throughbore 104 of sync valve 20. Once the shuttle 26 completely disengages discharge station 24 and the spring 130 forces the ball 120 against seat 132, ball 120' will be completely withdrawn permitting flow of coating material from only the piston pump 16'. At the same time, the shuttle 26 is moved to the filling station 22 of transfer unit 14 to begin the filling operation of piston pump 16 as described below.

Under normal operating conditions, the transfer unit 14 and transfer unit 14', together with their associated piston pumps 16 and 16', undergo a sequential filling and discharge operation so that an essentially continuous supply of coating material is provided to the spray guns 12. Dependent on the position of piston rod 40 associated with each piston pump 16 and 16', the shuttles 26 and 26' are positioned to either supply coating material to their respective piston pumps 16, 16' or permit the discharge of coating material therefrom. It should be understood that while the shuttles 26 and 26' are shown in FIG. 2 at opposite positions, such shuttles 26, 26' operate completely independently of one another. Accordingly, both of shuttles 26 and 26' could be in the down or discharge position at the same time in the event, for example, the piston pump 16 has not yet been emptied of coating material before piston pump 16, becomes completely filled. As noted above, operation of the sync valve 20 is controlled by the common four-way valve 68, which, in turn, is piloted in response to actuation of the lower limit valves 66 and 66'. These lower limit valves 66 and 66' do not supply pilot air except when the piston rod 40 or 40' of their associated pumps 16, 16' reach a predetermined, "empty" condition. Once that happens, then the transfer operation of the supply of coating material from one pump 16 or 16, to the other can proceed.

CIRCULATION OF COATING MATERIAL

As described above, the operation of system 10 under normal conditions involves the supply of coating material to the spray guns 12 alternately from the piston pump 16 in one parallel flow path, and then from the piston pump 16' in the other parallel flow path. But when operation of the spray guns 12 is terminated for a relatively long period of time, such as during a lunch break or if the coating production line is otherwise temporarily shut down, the coating material could remain stationary within the system 10. This can present problems with coating materials such as paint wherein the pigments, sediment and other solids can settle out if allowed to stagnate and remain stationary. In order to avoid this problem, the system 10 of this invention is provided with a "circulation" mode wherein the coating material can be constantly circulated through the system while the spray guns 12 are not being operated.

Figure 3:
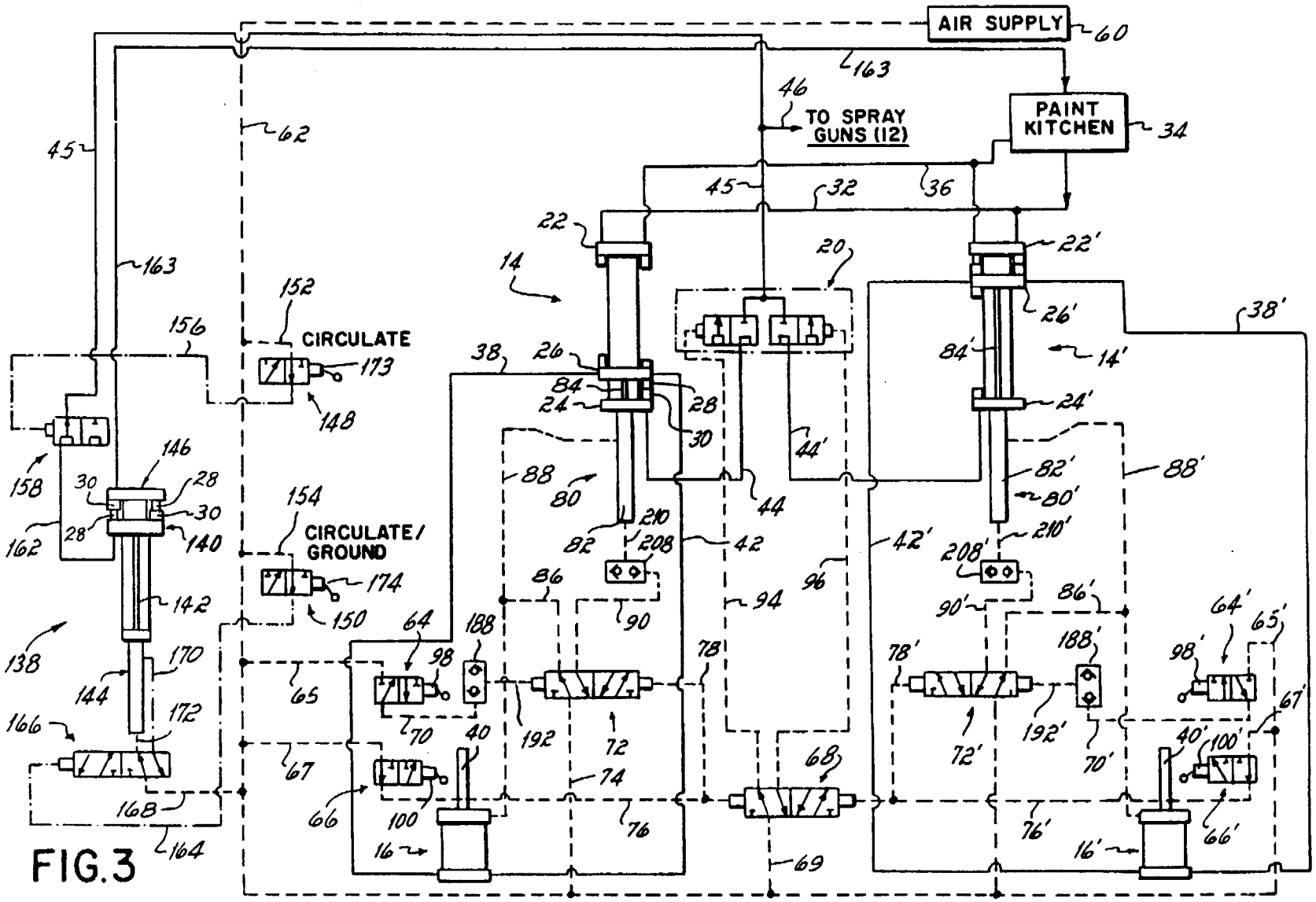
FIG. 3 is a schematic depiction of that portion of the system of FIG. 1 employed to execute the "circulate" function herein.

With reference to FIG. 3, the elements described above in connection with the normal operation of system 10 (FIG. 2) are employed to obtain coating material circulation, with the addition of structure on the lefthand side of FIG. 3. In the presently preferred embodiment, a "water" or "circulation" shuttle 138 is provided having a filling station 140 connected to the piston 142 of a linear actuator 144, and a discharge station 146 connected to a paint return line 163. The filling station 140 and discharge station 146 have mating coupling elements 28, 30 of the type described above.

The function of the water shuttle 138 is to permit a circulating flow of coating material to and from the paint kitchen 34 when activated by a circulate valve 148 and a circulate/ground valve 150. These valves are preferably valves of the type sold by Humphrey Products of Kalamazoo, Mich. under the Model No. 125V. The circulate valve 148 is connected to the primary air supply line 62 by a branch line 152, and the circulate/ground valve 150 is connected to air supply line 62 by a branch line 154. A pilot line 156 interconnects the circulate valve 148 and the pilot of a two-way valve 158. This two-way valve 158 is connected by the circulation line 45 to the sync valve 20, and by a transfer line 162 to the female coupling element 30 of the filling station 140 of water shuttle 138. As discussed below, the mating, male coupling element 28 of discharge station 146 is connected by a return line 163 to the paint kitchen 34. The circulate/ground valve 150 is connected by a pilot line 164 to the pilot of a four-way valve 166 preferably of the type sold by Humphrey Products under the Model No. FV-5P. The four-way valve 166 is connected by a branch line 168 to the primary air supply line 62, and by pilot lines 170 and 172 to the top and bottom, respectively, of the linear actuator 144 associated with water shuttle 138.

In order to initiate a circulation operation, both the circulate valve 148 and circulate/ground valve 150 are turned "on" by manually flipping their switches 173, 174 respectively. When opened, the circulate/ground valve 150 sends pressurized air through pilot line 164 to the four-way valve 166. This shifts the spool within the four-way valve 166 to the position illustrated in FIG. 3 allowing air from branch line 168 to pass through the four-way valve 166 into pilot line 172. In turn, the linear actuator 144 of water shuttle 138 moves the filling station 140 upwardly to the position shown in FIG. 3 wherein the filling station 140 and discharge station 146 are coupled to one another.

Activation of the circulate valve 148 permits pressurized air to be directed through pilot line 156 to the pilot of two-way valve 158. This shifts the two-way valve to the position shown in FIG. 3 allowing coating material from the circulation line 45 to flow through the two-way valve 158, into the transfer line 162 and then through the mating filling and discharge stations 140, 146 into the return line 163. A complete flow path is therefore provided from the sync valve 20, through the water shuttle 138 and then into the return line 163 so that the coating material can be circulated through the system to and from the paint kitchen 34.

The remainder of the system illustrated in FIG. 3, which is identical to that shown and described above in connection with FIG. 2, operates as if the spray guns 12 were activated. That is, the transfer units 14 and 14' and piston pumps 16, 16' receive and discharge coating material in the manner described above except that the coating material is circulated through the water or circulation shuttle 138 instead of being discharged through the spray guns 12. This ensures that the coating material remains in constant motion within the system 10 to substantially prevent settling of pigments, sediment or other solid materials within the coating material. Normal operation of the system 10 is resumed by simply switching "off" the circulate valve 148 and circulate/ground valve 150.

COLOR CHANGE PROCEDURE

Having described the normal dispensing operation of system 10, and a "circulation mode" wherein the coating material is circulated while the spray guns 12 are not operating, the following description is directed to the various steps for changing from one color of coating material to another. One important aspect of this invention is that a number of different cleaning or flushing steps can be performed simultaneously to clean virtually all elements of the system 10 at the same time and thus reduce the overall downtime associated with a color change operation. For ease of illustration and discussion, the different steps to effect a color change are discussed separately below, and then a description is provided of a complete color change operation as it would proceed in a production environment.

PAINT-OUT OPERATION

Figure 4:
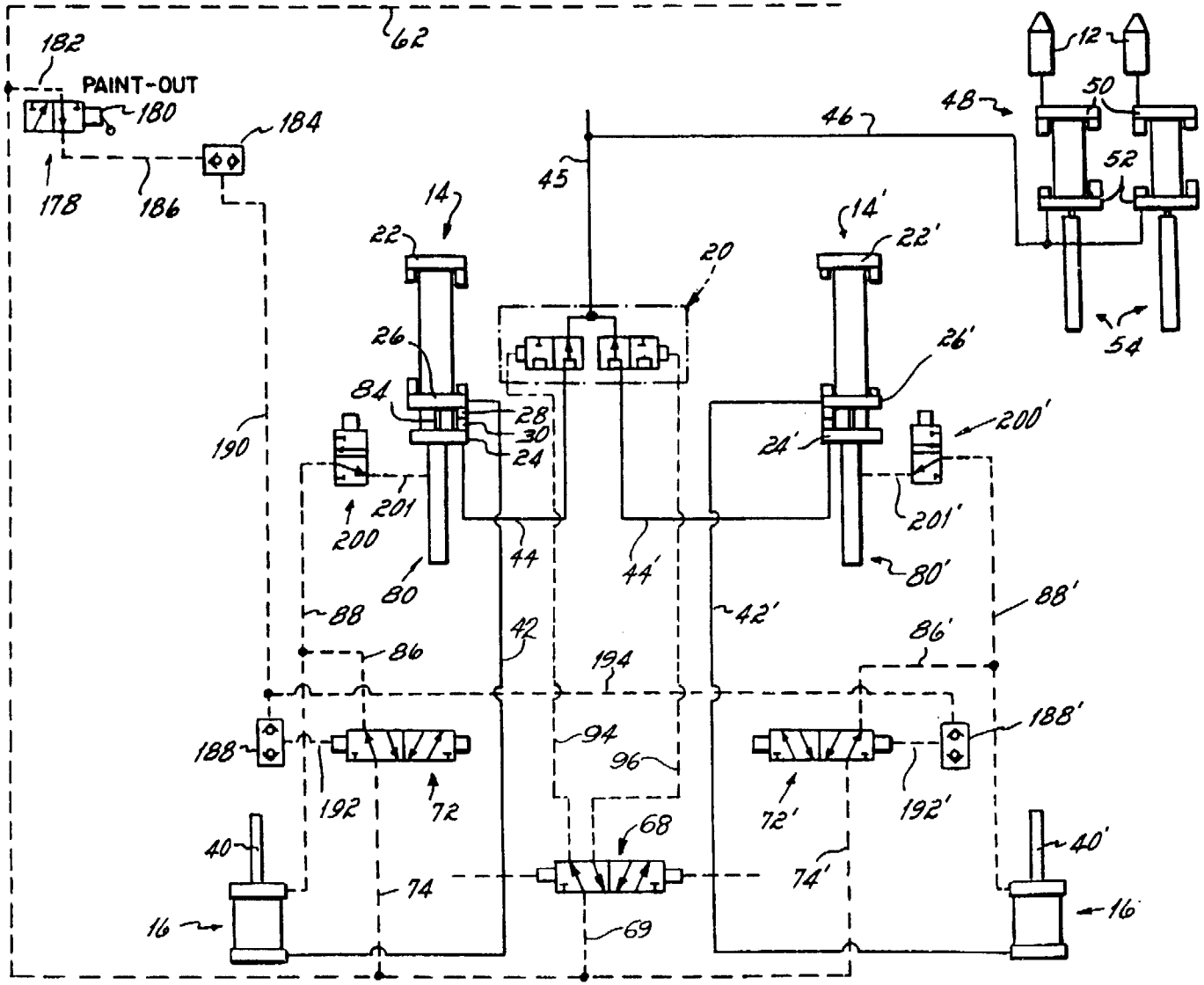
FIG. 4 is a schematic depiction of that portion of the system employed to execute the "paint out" sequence of operation herein.

Referring first to FIG. 4, an initial step in a color change operation involves returning substantially all of the coating material within the system 10 to the paint kitchen 34 before any of the lines or system elements are cleaned with flushing liquid. This operation is referred to as a "paint-out" mode which is schematically depicted in FIG. 4. Only those system elements necessary to perform the paint-out operation are incorporated in FIG. 4 for simplicity.

In the presently preferred embodiment, a paint-out valve 178 having a switch 180 is connected by a branch line 182 to the primary air supply line 62. The paint-out valve 178 is preferably a manual valve of the type sold by Humphrey Products under the Model No. 125V. A check valve 184 is connected to the paint-out valve 178 by a line 186, and to a second check valve 188 by a line 190. This second check valve 188, in turn, is connected by a pilot line 192 to the pilot of four-way valve 72 described above in connection with a description of the normal operation of system 10 as depicted in FIG. 2.

An air transfer line 194 connects line 190 to a check valve 188' associated with the second, parallel flow path on the righthand side of FIG. 4. This check valve 188' is connected by pilot line 192' to the pilot of four-way valve 72'. As mentioned above, each of the four-way valves 72 and 72' receive operating air from their respective branch lines 74, 74' and are effective to transfer pressurized air therethrough to the lines 86, 86' and operating lines 88, 88'. Preferably, valves 200 and 200' are connected between lines 88 and 88' and pilot lines 201, 201', which, in turn, extend to the top of linear actuators 80, 80', respectively.

In order to perform a "paint-out" operation, the paint-out valve 178 is placed in the "on" position by flipping its switch 180. Pressurized air is thus permitted to flow from branch line 182 through the paint-out valve 178 into line 186 where it passes through check valve 184 into line 190. The pressurized air then passes through each of the second check valves 188 and 188' to the pilots of their respective four-way valves 72, 72'. As described above in connection with the normal operation of the system in FIG. 2, the pilot air applied to four-way valves 72, 72' permits the transfer of operating air from primary air supply line 62 through the four-way valves 72, 72' to the top of the linear actuators 80, 80' associated with transfer units 16, 16', via lines 86, 86' and 88, 88'. In response to receipt of this pilot air, the linear actuators 80, 80' are effective to move their respective shuttles 26, 26' into the position illustrated in FIG. 4 wherein the shuttles 26, 26' are coupled to the discharge stations 24, 24', respectively. At the same time, operating air is transferred through lines 88, 88' to pumps 16, 16' which forces their pistons downwardly to exhaust any paint remaining therein.

Depending upon the position of the common four-way valve 68, the coating material from one of the piston pumps 16 or 16' is first directed through its associated transfer unit 14 or 14' to the sync valve 20, and then through line 46 to the spray guns 12. Because the shuttles 26 and 26' are disconnected from the filling station 22, 22' of each transfer unit 14, 14', no additional coating material from the paint kitchen 34 is transferred into either pump 16 or 16'. As a result, the coating operation proceeds with only that mount of coating material present within the piston pumps 16, 16'. Accordingly, the "paint-out" mode of operation is initiated when the application of the particular color of coating material within the system is nearly at an end, and it is known that the coating material without the piston pumps 16 and 16' is sufficient to complete that particular application before a color change is desired.

COATING MATERIAL DUMP

Figure 5:
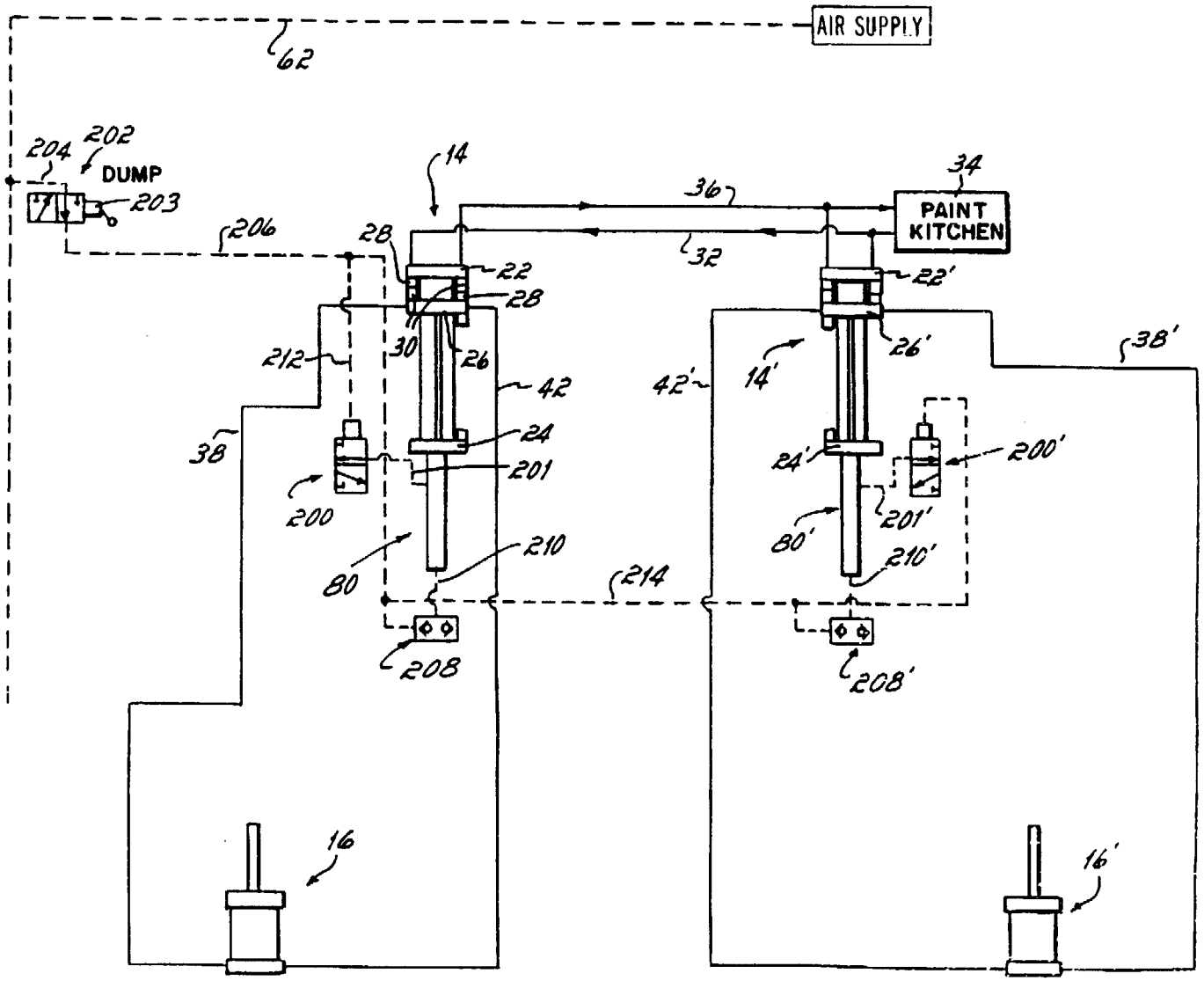
FIG. 5 is a schematic depiction of that portion of the overall system employed to execute the "dump" procedure herein.

With reference to FIG. 5, a further operational feature of this invention is illustrated which is useful to (1) remove any coating material remaining within pumps 16, 16' from the system and/or (2) provide for flushing of the lines leading to and from the pumps 16, 16' as well as the pumps themselves. Structure which is common to both parallel flow paths is given the same reference number in the following discussion, with the addition of a "prime" to the flow path associated with transfer unit 14' and pump 16'.

In the presently preferred embodiment, a dump valve 202, preferably of the type sold by Humphrey Products under Model No. S125, is connected by a branch line 204 to the primary air supply line 62. The outlet side of dump valve 202 is connected by a line 206 to a check valve 208 which, in turn, is connected by a pilot line 210 to the bottom of the linear actuator 80 associated with transfer unit 14. The top of linear actuator 80 is connected by line 201 to a valve 200 whose pilot is supplied with air via a tap line 212 connected to line 206. The valve 200 is moved to the position shown in FIG. 5, which vents the linear actuator 80, in response to the flow of air through dump valve 202 into line 206. Preferably, the valves 200' and 208' associated with the righthand side parallel flow path depicted in FIG. 5 are supplied with operating air via a tap line 214 connected to line 206.

When the dump valve 202 is turned to the "on" position by flipping its switch 203, pressurized air is allowed to pass through the dump valve 202 into the line 206. This pressurized air passes through each of the check valves 208 and 208' which, in turn, pilot the linear actuators 80, 80' such that the shuttles 26 and 26' of transfer units 14, 14' are moved to the "up" position as viewed in FIG. 5. In this position, the shuttles 26, 26' are coupled to their respective filling stations 22 and 22' which interconnects the paint supply line 32 from paint kitchen 34 to each of the piston pumps 16 and 16' via lines 38 and 38', and also couples piston pumps 16 and 16' to the paint return line 36 via transfer lines 42 and 42'. Accordingly, an essentially continuous path is provided from the paint kitchen 34, through the piston pumps 16, 16' and back to the paint kitchen 34.

As described in more detail below in connection with a discussion of a complete color change operation, a pumping unit within the paint kitchen 34 is operative to stop the flow of coating material into supply line 32 and instead direct cleaning fluid such as water into line 32 which is then circulated through the aforementioned flow paths to and from each piston pump 16 and 16'. As a result, all of the lines depicted in FIG. 5 can be cleaned of the coating material of one color in preparation for the next color during the "dump" mode of operation.

AGITATE OPERATION

Figure 6:
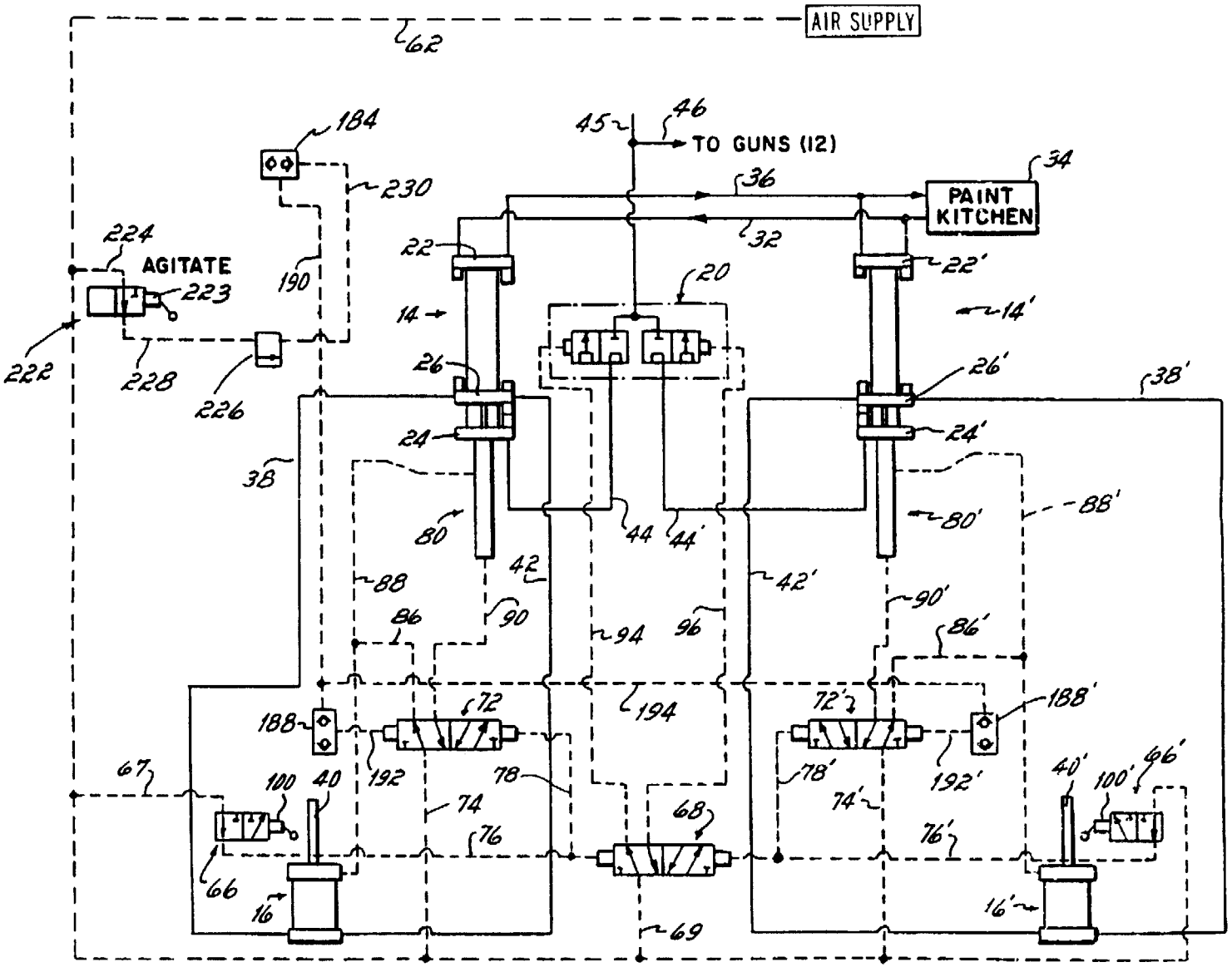
FIG. 6 is a schematic depiction of that portion of the system of FIG. 1 which operates to execute the "agitate" function of this invention.

Referring now to FIG. 6, the elements of system 10 which function to perform an "agitate" operation are illustrated. In this sequence, the pump pistons (not shown) are made to move up and down in short strokes near the base of the reservoir and their respective pumps 16 and 16' to dean any coating material remaining therein in preparation for a color change operation as discussed more fully below. The system operation in an agitate sequence is similar to that described above for the normal operating mode shown in FIG. 2, except that the piston pumps 16 and 16' are permitted to receive only a small quantity of flushing liquid before their respective piston rods 40, 40' are moved downwardly to discharge such fluid.

The primary difference between the agitate sequence and normal operating sequence is that each of the upper limit valves 64 and 64' (FIG. 1) are not allowed to operate, and their function is performed by the following "agitate" structure. In the presently preferred embodiment, an agitate valve 222 is connected by a branch line 224 to the primary air supply line 62. The outlet of agitate valve 222 is connected to a nonadjustable pressure regulator 226 via a line 228. In turn, the pressure regulator 226 is connected by a line 230 to the check valve 184 having an output connected by the line 190 to the second check valve 188. The output of this second check valve 188 is connected by the pilot line 192 to the pilot of four-way valve 72. As described in detail above, the four-way valve 72 controls the up and down movement of shuttle 26 by operating the linear actuator 80.

The other parallel flow path on the righthand side of FIG. 6 contains similar structure. A check valve 188' is connected by a tap line 194 to line 190 from check valve 184. In turn, check valve 188' is connected by pilot line 192' to the pilot of four-way valve 72'.

The agitate sequence proceeds as follows. Upon movement of the agitate valve 222 to the "on" position, e.g., by flipping its switch 223, pressurized air from the primary air supply line 62 is permitted to flow through the agitate valve 222 to the pressure regulator 226. Preferably, the pressure regulator 226 reduces the pressure of the air stream to approximately one-half of its normal level, and this reduced pressure stream is then transmitted through line 230, check valve 184 and line 190 to the second check valve 188. Line 194 transmits such reduced pressure air stream to the second check valve 188'. In turn, these check valves 188, 188' pilot their respective four-way valves 72 and 72' so that operating air is supplied to the top of actuators 80, 80' which moves shuttles 26 and 26' to their "down" position coupled to discharge stations 24 and 24', respectively. With the shuttles 26 and 26' in this position, the piston rods 40, 40' of piston pumps 16, 16' move downwardly to discharge their contents as described in detail above. Once such piston rods 40, 40' move to a predetermined lowermost position, the lower limit valves 66 and 66' are released and send comparatively high pressure pilot air to the opposite side of each of the four-way valves 72 and 72' from lines 76, 76', and 78, 78', as described above. This shifts the pool in four-way valves 72, 72' such that operating air is supplied to the bottom of linear actuators 80, 80' thus moving the shuttles 26, 26' upwardly into coupling engagement with the filling stations 22 and 22' of transfer units 14, 14'. When coupled to the filling stations 22, 22', the shuttles 26, 26' receive liquid from the paint kitchen 34 via supply line 32. In the flushing operation described below, this liquid is preferably a flushing liquid such as water.

The flushing liquid is transmitted from the filling stations 22, 22' through each of the transfer lines 38, 38' into the respective piston pumps 16, 16'. The piston pumps 16, 16' therefore begin to fill with flushing liquid and their piston rods 40, 40' move upwardly. But the piston pumps 16, 16' only receive a limited quantity of flushing liquid before the four-way valves 72, 72' are again piloted by air from the check valves 188 and 188'. The reduced pressure strewn of air supplied to check valves 188, 188' from pressure regulator 226 is always present when valve 222 is open and acts as an "air spring" which pilots one side of the four-way valves 72, 72' via lines 192, 192', respectively. The reduced pressure pilot air from check valves 188, 188' is effective to move the spools of valves 72, 72' to the position shown in FIG. 6 as soon as the higher pressure air supplied to the other side of valves 72, 72' by limit valves 66, 66' is removed. This occurs as soon as the pumps 16, 16' begin to refill and raise their piston shafts 40, 40' so that valves 66, 66' are closed and cut off the higher pressure air flowing through lines 76, 76' and lines 78, 78' to valves 72, 72'. Therefore, the piston pumps 16, 16' are allowed to be connected to the paint kitchen 34 for only a brief period of time. When piloted by the check valves 188, 188', the four-way valves 72, 72' disconnect their respective shuttles 26, 26' from the filling stations 22, 22' and return the shuttles 26, 26' to the discharge stations 24, 24'. In turn, the piston pumps 16, 16' are activated to discharge the flushing fluid therefrom. As a result, the pistons of each piston pump 16, 16' are made to move upwardly and downwardly in short strokes as the reservoirs of the piston pumps 16, 16' are first partially filled with flushing liquid and then emptied of same. This "agitate" operation effectively cleans the piston pumps 16, 16' in preparation for the receipt of a coating material of different color.

WATER FLUSH OPERATION

Figure 7:
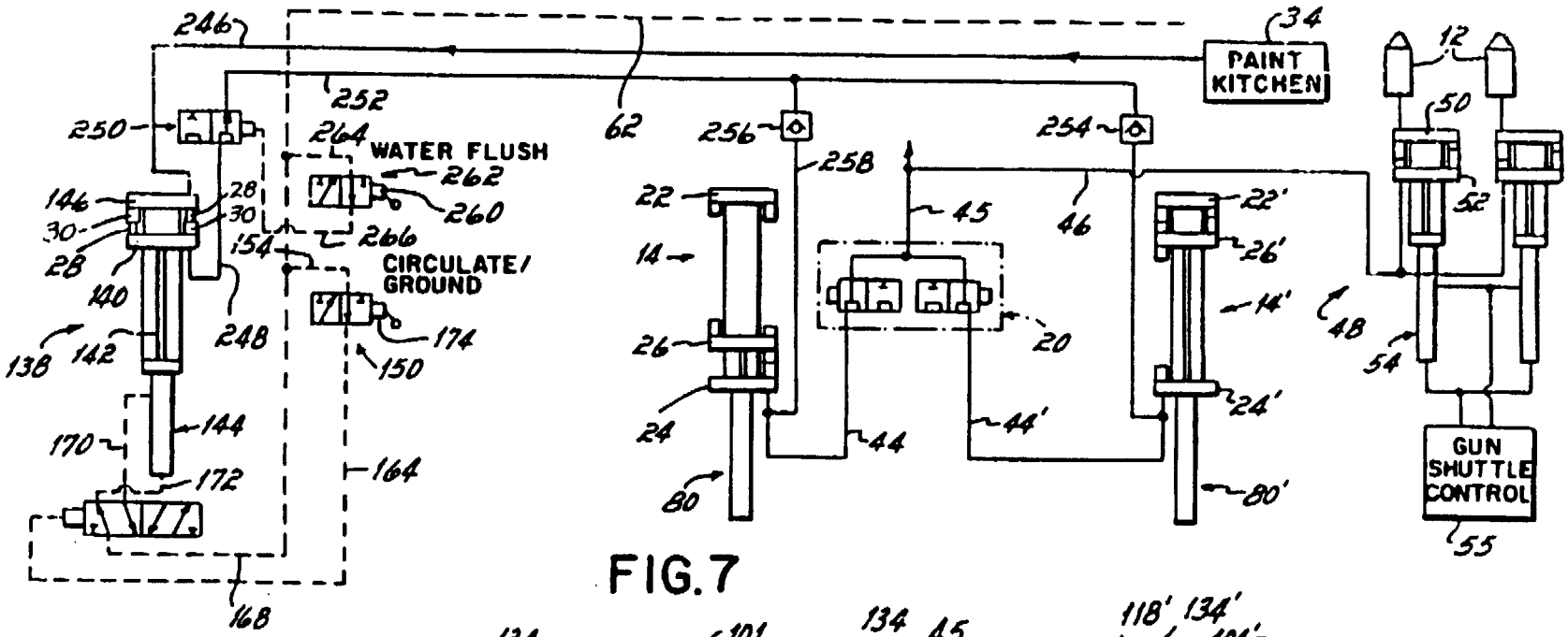
FIG. 7 is a schematic depiction of that portion of the system of FIG. 1 employed to execute the "water flush" function herein.

With reference to FIG. 7, a still further sequence of operation is illustrated which is useful in connection with cleaning the system 10 in preparation for a color change. The purpose of this operational sequence is to flush those elements of the system which the other operations have not reached including (1) the lines 44, 44' interconnecting the transfer units 14, 14' to the sync valve 20, (2) the sync valve 20, (3) the line 46 interconnecting the sync valve 20 with the gun shuttles 48, (4) the gun shuttles 48 themselves, and (5). the spray guns 12.

A pumping unit (not shown) contained internally of the paint kitchen 34 is employed to directed flushing liquid into a water supply line 246 whose opposite end is connected to the male coupling element 28 at the discharge station 146 of water shuttle 138. The female coupling element 30 of filling station 140 associated with water shuttle 138 is connected by a line 248 to a two-way valve 250. This two-way valve 250, in turn, is connected by a return line 252 through a check valve 254 to the discharge line 44' associated with transfer unit 14'. A second check valve 256 is carried within a tap line 258 which interconnects the return line 252 with the discharge line 44 associated with the transfer unit 14. These transfer lines 44, 44' are connected to the sync valve 20 which, in turn, is connected by the circulation line 45 and gun supply line 46 to the gun shuttles 48 associated with spray guns 12. As described above, these gun shuttles 48 are controlled by a gun shuttle control 55 which, in this water flush sequence of operation, is operative to activate the linear actuator 54 of each gun shuttle 48 so that their respective discharge and filling stations 50, 52 are coupled to one another. In applications wherein automatic dispensers are utilized instead of manually operated spray guns, the gun shuttles 48 are eliminated and the flushing fluid is transmitted directly through line 45 and 46 to the spray guns 12.

In order to initiate the water flushing operation, the switch 260 of a water flush valve 262 is moved to the "on" position thus allowing operating air from the primary air supply line 62 to pass through the water flush valve 262 via a line 264. This operating air exits the water flush valve 262 into a pilot line 266 which is connected to the pilot of two-way valve 250. At the same time the water flush valve 262 is actuated, the circulate/ground valve 150 is moved to the "on" position, which, as described above in connection with a discussion of FIG. 3 causes the filling station 140 and discharge station 146 of water shuttle 138 to couple with one another. A complete flow path is therefore formed wherein flushing liquid, such as water, is transmitted from the paint kitchen 34 through the water supply line 246 and water shuttle 138 to the two-way valve 250 via line 248. Because the two-way valve 250 has been opened by water flush valve 262, the flushing water continues through return line 252 and tap line 258 into each of the discharge lines 44, 44' associated with transfer units 14, 14'. The flow of flushing water continues through the sync valve 20 from discharge lines 44, 44', and then from the gun supply line 46 either through the gun shuttles 48 or directly into each of the dispensers 12. All of these elements are therefore cleaned by the flushing liquid in preparation for a coating material of different color.

COMPLETE COLOR CHANGE OPERATION

With reference now to FIGS. 3–7, a complete color change operation in a production environment proceeds as follows. Initially, the pump within the paint kitchen 34 which supplies coating material to the system 10 is turned off. The paint-out valve 178 is then turned "on" which moves both of the shuttles 26 and 26' to the down position depicted in FIG. 4 with the valves 200 and 200' in the position shown in such Fig. As described above, the coating operation can continue with the shuttles 26, 26' down, but only the coating material present within the piston pumps 16 and 16' when the paint-out valve 178 is activated is supplied to spray guns 12. No more additional paint is added to the pumps 16, 16' because the shuttles 26, 26' are in the down position and the paint supply has been turned off.

Assuming the coating operation is terminated before all of the paint is removed from the pumps 16, 16' in the "paint-out" sequence, the next step in the color change operation is to completely empty the piston pumps 16, 16' of all coating material. To accomplish this, the system is placed in a slightly modified "circulate" mode by turning the circulate valve 148 and circulate/ground valve 150 "on," while maintaining the paint-out valve 178 "on," so that the shuttles 26 and 26' remain in the down position. With the shuttles 26 and 26' down and the circulate valve 148 and circulate/ground valve 150 "on," coating material is transferred from each of the piston pumps 16 and 16', through the water shuttle 138 and to the paint kitchen 34 as described above in connection with the circulation mode of operation. That is, each piston pump 16, 16' transmits coating material through its associated transfer line 42, 42' and discharge line 44, 44' to the sync valve 20. The coating material flows from the sync valve 20 to the water shuttle 138 as described above, and from there is returned to the paint kitchen 34 via the paint return line 163. Because the shuttles 26 and 26' are maintained in a "down" position by the paint-out valve 178, no new paint or any flushing liquid is supplied to the system and thus the piston pumps 16 and 16' can be essentially completely emptied.

The next step in the color change operation occurs internally of the paint kitchen 34 wherein a flushing liquid such as water is diverted into the main paint supply line 32. A separate pump (not shown) contained internally of the paint kitchen 34 has an inlet connected to a source of flushing liquid, such as water, and an outlet connected to the paint supply line 32.

The system flushing operation is now initiated such that nearly each line and element of the system 10 is cleaned simultaneously. The flushing operation is begun by turning off the paint-out valve 178 and then turning "on" the dump valve 202, agitate valve 222, water flush valve 262, and circulate/ground valve 150. The dump valve 202 moves the shuttles 26 and 26' to the "up" position depicted in FIG. 5 and they remain there until the next operating sequence described below. The dump, agitate and water flush operations proceed simultaneously in the manner described above. In the "dump" mode of operation, the flushing water is transmitted through each of the lines and elements depicted in FIG. 5 thus cleaning the paint supply line 32, the filling stations 22, 22', shuttles 26, 26', transfer lines 38, 38', piston pumps 16, 16', second transfer lines 42, 42' and return line 36. The piston pumps 16, 16' are further cleaned by the agitate cycle described above. The "water flush" sequence, as described above and shown in FIG. 7, cleans most of the remaining elements of the system including the discharge line 44, 44', sync valve 20, circulation line 45 and gun supply line 46. The gun shuttle control 55 is operated at this time to also permit flushing of gun shuttles 48 and spray guns 12. Additionally, the circulation valve 148 can also be closed at this time to obtain a flow of flushing water through the water shuttle 138 and into paint return line 36 to clean it.

The next step in the cleaning operation is to briefly close the agitate valve 222 while the dump valve 202, water flush valve 262 and recirculate/ground valve 150 are allowed to remain open. Briefly closing the agitate valve 222 allows the piston pumps 16, 16' to at least partially fill with water. All of the valves are then closed with the exception of the paint-out valve 178 which, as described above, causes the piston pumps 16 and 16' to empty. This forces the flushing water allowed to collect therein through transfer lines 42, 42', into shuttles 26, 26' and then through the discharge stations 24 and 24' which had not previously been cleaned by any of the flushing operations.

Finally, the paint-out valve 178 is again closed and the operator opens the dump valve 202, agitate valve 222, water flush valve 262 and circulate/ground valve 150 for a few agitation cycles, i.e., wherein the pistons within piston pumps 16 and 16' move upwardly and downwardly a few times. The supply of flushing water from the paint kitchen 34 is then terminated, and replaced with a flow of compressed air through a line (not shown) which is connected to the paint supply line 32. This compressed air is allowed to flow through the system, with all of the aforementioned valves open, to remove any flushing water remaining in the system. All valves are then turned off, and the pump within the paint kitchen 34 is turned "on" to resupply the system 10 with fresh paint of a different color.

It should also be noted that the system 10 is provided with a safety feature associated with the paint kitchen 34 which depends upon operation of the circulate/ground valve 150 described above. A pair of safety door lock valves 275 and 277, preferably of the type manufactured by Humphrey Products under Model No. FV-3P, are included in the cabinet (not shown) containing the pumps and shuttles of this invention. See FIG. 1. A tap line 279 transmits pressurized air from air supply line 62 directly to valve 277, and a branch line 281 interconnects valve 275 to line 279. The outputs of valves 275, 277 are connected by lines 283, 285, respectively, to a common check valve 287 whose output is connected by a line 289 through the circulate/ground valve 150 to the pilot of valve 166. If a door of the paint kitchen 34 is opened, one or both of the safety valves 275, 277 are piloted such that a flow of pressurized air is transmitted through the circulate/ground valve 150. This connects filling station 140 with discharge station 146 of water shuttle 138 to permit the flow of water into the system through line 246, as described below in connection with the water flush operation (see FIG. 7), causing the electrostatics associated with spray guns 12 to ground out.

ALTERNATIVE EMBODIMENTS OF FIGS. 8, 8A AND 9

Figure 8A:
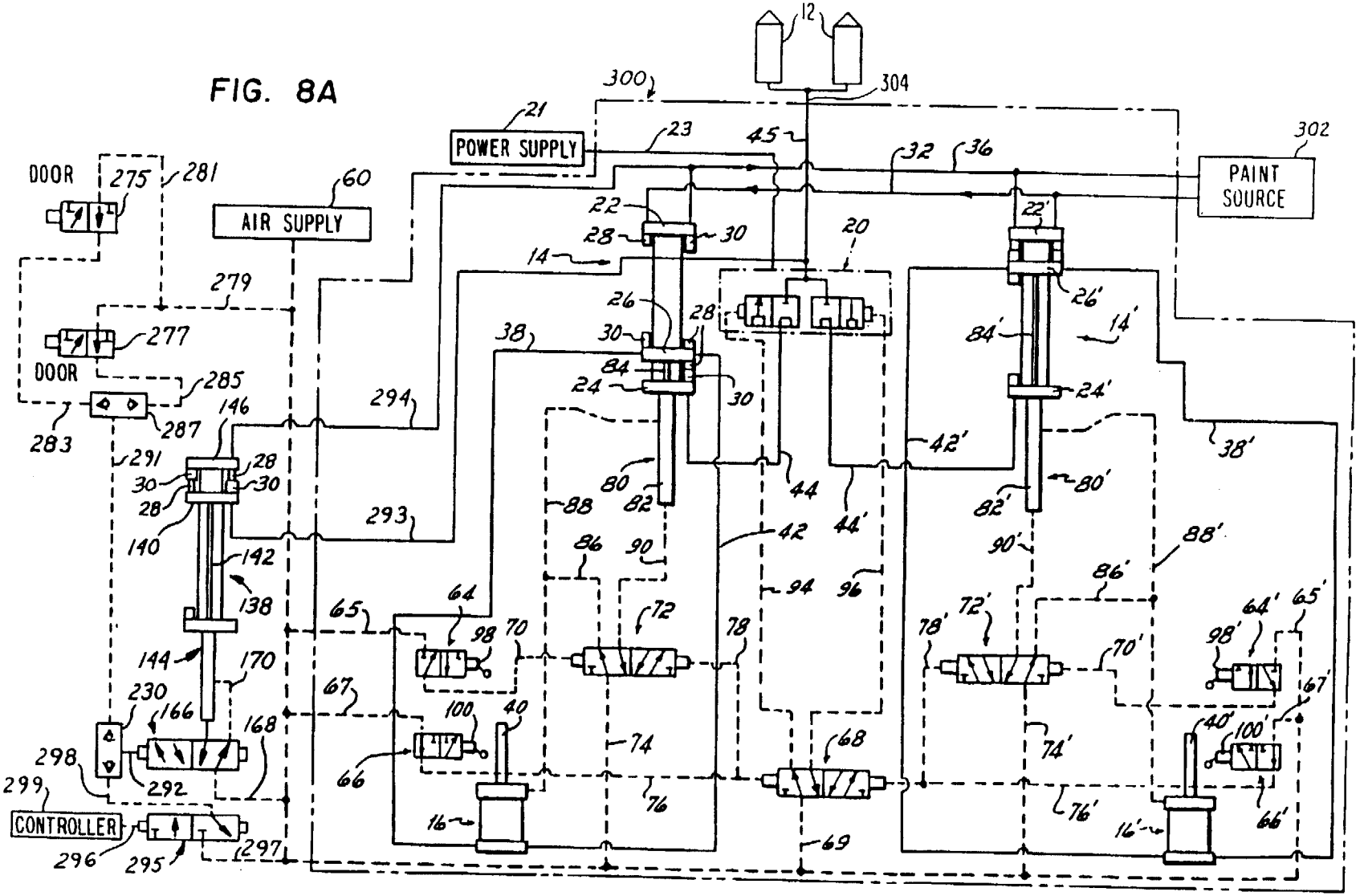
FIG. 8A is a schematic depiction, similar to FIG. 8, of a still further alternative embodiment of the apparatus herein.

With reference to FIGS. 8, 8A and 9, a voltage block system 300 is depicted which is essentially a simplified version of the system 10 shown in FIGS. 1–7 and discussed in detail above. Preferably, system 300 incorporates a dedicated paint source 302 of a single color which is connected via lines 32 and 36 to the transfer units 14, 14'. The structure and operation of transfer units 14, 14' is identical to that described above. But, because system 300 employs a single, dedicated paint source 302, the structure associated with the embodiment of FIGS. 1–7 for performing a color change operation, and for cleaning or flushing the system 10, is eliminated in system 300. Additionally, in this embodiment, the sync valve 20 is directly connected by a line 304 to one or more dispensers 12. The coating material transmitted from sync valve 20 through line 304 is electrostatically charged by the power supply 21 connected to sync valve 20 by line 23 in the same manner described above in connection with FIGS. 1–7. Preferably, the system 300 is used primarily with automatic spray guns or rotary atomizers rather than manual, hand-held guns.

The embodiments of FIGS. 8 and 8A also include structure for circulating the coating material back to the paint source 302 to maintain the coating material moving when the dispensers 12 are not operating. In FIG. 8, the circulation shuttle 138, four-way valve 166, door valves 275, 277 and check valve 287 described above in connection with FIGS. 1–7 are employed with the addition of a second check valve 230 having an input connected by a line 291 to check valve 287 and a output connected by a line 292 to the pilot of four-way valve 166. Additionally, a first connector line 293 is connected between the filling station 140 of shuttle 138 and line 304, and, a second connector line 294 is connected between the discharge station 146 of shuttle 138 and return line 36.

In response to opening of either safety lock door valve 275 or 277, pilot air is supplied through check valve 287, line 291 and second check valve 230 to the pilot of four-way valve 166. As described above, when piloted, the four-way valve 166 causes the filling station 140 of shuttle 138 to couple with its discharge station 146 thus providing a flow path from line 304, through first connector line 293 to the shuttle 138 and then through second connector line 294 to the paint source 302 via return line 36. The coating material essentially bypasses the dispensers 12 and is transmitted along such flow path, to and from the source 302, while the remainder of the system 300 operates as if coating material was being supplied to the dispensers 12.

In the alternative embodiment shown in FIG. 8A, the same circulation structure is illustrated as in FIG. 8, with the addition of a solenoid valve 295 connected by an electrical line 296 to a controller 299 and by an air line 297 to the air supply line 62. The controller 299 is a standard programmable control, such as a personal computer, which is also operatively connected to the dispensers 12 in a manner not shown. The solenoid valve 295, in turn, is connected by a line 298 to the second check valve 290. The purpose of solenoid valve 295 is to provide for circulation of the coating material depending upon whether the dispensers 12 are operating or not. For example, when automatic dispensers 12 are employed, the controller 299 is effective to turn the dispensers 12 on and off as required At the same time controller 299 turns the dispensers 12 off, a signal is sent via line 296 to the solenoid valve 295 which is activated to allow pilot air from line 297 to pass therethrough and enter line 298 to second check valve 230. This air flow pilots the four-way valve 166, which, as explained above, causes the filling station 140 of circulation shuttle 138 to couple With discharge station 146 and circulate the coating material to and from the paint source 302. Accordingly, the FIG. 8A embodiment provides essentially the same circulation of coating material through the system 300 as FIG. 8, except in FIG. 8A such circulation is initiated by closing of dispensers 12.

With particular reference to FIG. 9, the system 300 of FIG. 8 (or FIG. 8A) is shown in a configuration to permit different colored coating materials to be supplied to one or more dispensers 12. As schematically represented in FIG. 9, three separate sources of different color paint 302A, 302B, and 302C supply coating material to three separate systems 300A, 300B, and 300C, respectively. Each of these systems 300A, 300B, 300C are identical in structure and function to the system 300 depicted in FIGS. 8 or 8A. Each separate system 300A, 300B, 300C is connected by a separate feed line 306A, 306B, 306C to a color changer 308 of the type disclosed in U.S. Pat No. 4,657,047 to Kolibas, owned by the assignee of this invention. As discussed in detail in that patent, the color changer 308 is effective to supply a selected color via a line 310 to the dispensers 12. Because each individual system 300A, 300B, 300C supplies a single color, no flushing or other cleaning is needed in between color changes except for the color changer 308, line 310 and dispensers 12. Such flushing operation can be easily and rapidly performed as described in U.S. Pat. No. 4,657,047, thereby substantially limiting downtime between color changes.

The embodiments of this invention depicted in FIGS. 8, 8A and 9 therefore provide simplified alternatives to the FIGS. 1–7 embodiment, and are particularly useful in high volume applications employing automatic spray guns.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for supplying electrically conductive coating material to at least one electrostatic coating dispenser comprising:

transferring coating material from a supply through a first *movable* transfer unit *which is located at a filling position* to a first reservoir and through a second *movable* transfer unit *which is located at a filling position* to a second reservoir while electrically isolating the [supply] *reservoirs* from the coating dispenser;

transferring the coating material from said first and second reservoirs *through said first and second movable transfer units when located in a discharge position* to a flow control means *while electrically isolating said first and second reservoirs from said supply*;

alternately transferring the coating material through said flow control means to the coating dispenser from said first reservoir and said second reservoir;

moving said first transfer unit to [a first] *said discharge* position *at which said first transfer unit is operative both* to electrically isolate said first reservoir from said supply *and to block flow therebetween* while *transferring* coating material [is being transferred] from said first reservoir through said flow control means to the coating dispenser, *and then moving said first transfer unit to said filling position at which said first transfer unit is operative both to electrically isolate said coating dispenser from said first reservoir and to block flow therebetween while coating material is being transferred from said supply to said first reservoir*;

moving said second transfer unit to [a second] *said discharge* position *at which said second transfer unit is operative both* to electrically isolate said second reservoir from said supply *and to block flow therebetween* while said coating material is being transferred from said second reservoir through said flow control means to the coating dispenser, *and then moving said second transfer unit to said filling position at which said second transfer unit is operative both to electrically isolate said coating dispenser from said second reservoir and to block flow therebetween while coating material is being transferred from said supply to said second reservoir*; and electrically charging the coating material sprayed from the coating dispenser.

2. The method of claim 1 further comprising the steps of:

sensing when coating material supplied to said first and second reservoirs reaches an upper limit, and then terminating the flow of coating material from the supply into said reservoirs in response thereto;

sensing when the coating material reaches a lower limit in whichever one of said first and second reservoirs is supplying coating material through said flow control means to the coating dispenser, and then shifting said flow control valve in response thereto to begin supplying coating material from the other of said first and second reservoirs through said flow control valve to the coating dispenser.

3. The method of claim 2 wherein when said lower limit is sensed at said one reservoir which is supplying coating material through said flow control means to said coating dispensers, in addition to the step of shifting said flow control means, the method further comprises the step of isolating said reservoir from said electrostatic coating dispenser and refilling said reservoir from said supply in response to the sensing of said lower limit.

4. A method of supplying electrically conductive coating material of two or more colors to coating dispensers, comprising:

transferring coating material of a first color from a first supply to first and second reservoirs;

transferring said first color of coating material from said first and second reservoirs to a first flow control valve;

transferring coating material of a second color from a second supply to third and fourth reservoirs;

transferring said second color of coating material from said third and fourth reservoirs to a second flow control valve;

transferring said first color of coating material from said first or second reservoirs through said first flow control valve to a color change manifold;

transferring said second color of coating material from said third or fourth reservoirs through said second flow control valve to said color change manifold;

operating said color change manifold to send said first or second color of coating material therethrough to said coating dispensers;

electrically isolating from their respective first or second supplies whichever of said first, second, third, or fourth reservoirs is supplying coating material to said color change manifold; and electrostatically charging the coating material sprayed from said coating dispensers.

5. The method of claim 4 in which said step of transferring said first color of coating material further comprises switching the flow of said first color of coating material transferred to the color change manifold from one of the first and second reservoirs to the other when said one reservoir is depleted of coating material.

6. The method of claim 4 in which said step of transferring said second color of coating material further comprises switching the flow of said second color of coating material transferred to the color change manifold from one of the third and fourth reservoirs to the other when said one reservoir s depleted of coating material.

7. The method of transmitting electrically conductive coating material to at least one electrostatic coating dispenser, comprising:

supplying coating material to a first holding means from a first transfer unit which is connected to the source of coating material and to the coating dispenser, said transfer unit maintaining the first holding means electrically isolated from the coating dispenser which coating material is supplied to the first holding means;

supplying a second holding means with coating material from a second transfer unit which is connected to the source of coating material and to the coating dispenser, said transfer unit maintaining the second holding means electrically isolated from the coating dispenser while coating material is supplied to the second holding means;

transferring coating material from one of the first and second holding means to the coating dispenser while maintaining said one holding means electrically isolated from the source; and switching the flow of coating material transferred to the coating dispenser to the other of the first and second holding means when said one holding means is depleted of coating material.

8. The method of claim 7 in which said step of supplying coating material to the first holding means comprises moving a first shuttle into coupling engagement with a first filling station connected to the source of coating material, and transferring the coating material from the first filling station through the first shuttle into the reservoir of a first pump.

9. The method of claim 8 in which said step of supplying coating material to the second holding means comprises moving a second shuttle into coupling engagement with a second filling station connected to the source of coating material, and transferring the coating material from the second filling station through the second shuttle into the reservoir of a second pump.

10. The method of claim 9 in which said step of transferring coating material comprises moving said first shuttle into coupling engagement with a first discharge station which communicates with the coating dispenser, and then transmitting coating material from the reservoir of said first pump through said first shuttle and said first discharge station to the coating dispenser, and wherein said step of switching the flow of coating material comprises moving said second shuttle into coupling engagement with a second discharge station which communicates with the coating dispenser and transmitting coating material from said second pump through said second shuttle and said second discharge station to the coating dispenser while terminating the flow of coating material from said first pump.

11. The method of claim 7 further comprising the steps of:

producing a signal representative of a depleted condition of said one of said first and second holding means; and switching the flow of coating material transferred to the coating dispenser to the other of said first and second holding means in response to production of said signal.

12. The method of claim 11 in which said step of transferring coating material comprises transmitting coating material from the reservoir of one of a first and second pumps to the coating dispenser by movement of a piston within the reservoir of said one pump, and wherein said step of producing a signal comprises sensing the movement of the piston within the reservoir of said one of said first and second pumps, and generating a signal when the piston reaches a predetermined position.

13. The method of claim 7 further comprising the steps of:

terminating the supply of coating material to each of said first and second holding means, transmitting coating material remaining in the first and second holding means back to the source; and then transmitting a flushing fluid through each of said first and second holding means and the coating dispenser to remove the coating material therefrom.

14. The method of transmitting electrically conductive coating material to at least one electrostatic coating dispenser, comprising:

supplying coating material to a first pump from a source of coating material while maintaining the first pump electrically isolated from the coating dispenser, the first pump having a reservoir and a piston movable within the reservoir;

supplying a second pump with coating material from the source while maintaining the second pump electrically isolated from the coating dispenser, the second pump having a reservoir and a piston movable within the reservoir;

transferring coating material from one of the first and second pumps to the coating dispenser while maintaining said one pump electrically isolated from the source;

switching the flow of coating material transferred to the coating dispenser to the other of the first and second pumps when said one pump is depleted of coating material;

terminating the supply of coating material to each of the first and second pumps, and the transmitting a flushing fluid to the first and second pumps; and alternately moving the piston of each of the first and second pumps in one direction and then in the opposite direction while flushing fluid is present within the reservoirs thereof to clean coating material from the reservoirs.

15. The method of transmitting electrically conductive coating material to at least one electrostatic coating dispenser, comprising:

supplying coating material to a first holding means from a source of coating material while maintaining the first holding means electrically isolated from the coating dispenser;

supplying a second holding means with coating material from the source while maintaining the second holding means electrically isolated from the coating dispenser;

transferring coating material from one of the first and second holding means to the coating dispenser while maintaining said one holding means electrically isolated from the source;

switching the flow of coating material transferred to the coating dispenser to the other of the first and second holding means when said one holding means is depleted of coating material; and circulating coating material through the first and second holding means to and from the source when the coating material is not being discharged from the coating dispensers.

16. Apparatus for transmitting electrically conductive coating material to at least one electrostatic coating dispenser, comprising:

a first transfer unit and a second transfer unit each having an inlet adapted to be connected to at least one common source of electrically conductive coating material, an outlet, and, a holding means for receiving coating material from said inlet and for transmitting coating material to said outlet;

voltage block means, associated with each of said first and second transfer units, which is movable to a first position for electrically isolating said holding means from said outlet while said holding means receives coating material, and which is movable to a second position for electrically isolating said holding means from said inlet while said holding means transmits coating material to said outlet;

flow control means, connected to said outlet of each of said first and second transfer units, for sequentially supplying coating material from said first transfer unit and from said second transfer unit to at least one electrostatic coating dispenser.

17. The apparatus of claim 16 further including sensor means, associated with each of said first and second transfer units, for producing a representative of a low level condition of said holding means.

18. The apparatus of claim 17 in which each of said holding means is a pump formed with a reservoir, said pumps each including a piston movable within said reservoir and a piston rod which is connected to said piston and extends outwardly from said reservoir.

19. The apparatus of claim 18 in which said flow control means includes a sync valve having a valve body formed with a central bore connected to an outlet which is adapted to communicate with said at least one coating dispenser, a first inlet connected to said central bore and to said outlet of said first transfer unit, a second inlet connected to said central bore and to said outlet of said second transfer unit, a first valve carried within said first inlet which is movable between an open and closed position relative to the intersection of said first inlet and said central bore, and a second valve carried within said second inlet which is movable between an open and closed position relative to the intersection of said second inlet and said central bore.

20. The apparatus of claim 19 in which each said sensor means is a limit valve engageable with said piston rod of said pump associated with one of said first and second transfer units, each of said limit valves being effective in response to movement of their associated piston rods to a predetermined, lowermost position to produce said signal and cause one of said first and second valves to move from a closed position to an open position.

21. The apparatus of claim 20 in which said first and second valves of the synch valve each include a piston at one end and a ball engageable with a seat located at the intersection of said first and second inlets and said central bore, respectively, said flow control means further comprising a pilot valve connected to said limit valve of each of said first and second transfer means and to said sync valve, said pilot valve being effective upon receipt of said signal from said limit valve associated with one of said first and second transfer means to cause said valve within said sync valve associated with the other of said first and second transfer means to open.

22. The apparatus of claim 16 in which each of said first and second transfer units includes a filling station formed with said inlet, and a discharge station formed with said outlet said discharge station being spaced from said filling station.

23. The apparatus of claim 22 in which said voltage block means of each of said first and second transfer units comprises a shuttle movable between said filling station and said discharge station, said shuttle being connected to said holding means so that upon movement of said shuttle to said filling station the coating material is transmitted into said holding means and upon movement of said shuttle to said discharge station the coating material is transmitted from said holding means to said outlet.

24. The apparatus of claim 16 in which said flow control means is adapted to communicate with a coating dispenser and includes means for switching the flow of coating material to the coating dispenser from said holding means of one of said first and second transfer units to said holding means of the other of said first and second transfer units without interrupting the flow of coating material to the coating dispenser.

25. The apparatus of claim 24 in which said flow control means includes a sync valve, including:

a first inlet connected to said outlet of said first transfer unit and communicating with said holding means thereof;

a second inlet connected to said outlet of said second transfer unit and communicating with said holding means thereof;

an outlet internally connected to each of said first and second inlets; and check means for closing one of said first and second inlets while opening the other.

26. The apparatus of claim 25 in which said flow control means further includes a pilot valve connected to said check means of said sync valve and communicating with each of said holding means, said pilot valve being effective to operate said check means when the coating material within one of said holding means is at a low level so that said inlet of said sync valve communicating with the other of said holding means is opened while said inlet of said one holding means is being closed, whereby a substantially continuous flow of coating material through said sync valve to the coating dispenser is maintained.

27. Apparatus for transmitting electrically conductive coating material to at least one electrostatic coating dispenser, comprising:

first and second pumps each having a reservoir formed with an inlet and an outlet;

first transfer means for supplying coating material to said first pump, said first transfer means including:

(i) a filling station adapted to be connected to a source of coating material;

(ii) a discharge station spaced from said filling station; and (iii) a first shuttle movable between said filling station and said discharge station, said first shuttle being connected to said inlet and outlet of said first pump and being releasably couplable to each of said filling and discharge stations, said shuttle being effective to permit the transfer of coating material into said reservoir of said first pump when coupled to said filling station and to permit the transfer of coating material from said pump reservoir when coupled to said discharge station;

second transfer means for supplying coating material to said second pump, said second transfer means including:

(i) a filling station adapted to be connected to a source of coating material;

(ii) a discharge station spaced from said filling station;

(iii) a second shuttle movable between said filling station and said discharge station, said second shuttle being connected to said inlet and outlet of said second pump and being releasably couplable to each of said filling and discharge stations, said shuttle being effective to permit the transfer of coating material into said reservoir of said second pump when coupled to said filling station and to permit the transfer of coating material from said pump reservoir when coupled to said discharge station;

flow control means, connected to said discharge station of each of said first and second transfer means, for sequentially transmitting coating material supplied from said first pump and said second pump through their associated discharge stations to at least one coating dispenser.

28. The apparatus of claim 27 in which said filling station of each of said first and second transfer units is connected to a source of flushing liquid, said apparatus further comprising flushing means for simultaneously transmitting a flushing fluid from said source of flushing fluid through said first and second pumps, said first and second transfer units, said flow control means and said at least one coating dispenser in preparation for changing to a coating material of different color.

29. The apparatus of claim 28 in which said flushing means includes means for connecting said source of flushing fluid to a first discharge line which interconnects said discharge station of said first transfer unit with said flow control means, and for connecting said source of flushing fluid to a second discharge line which interconnects said discharge station of said second transfer unit with said flow control means, whereby a flow path for the flushing fluid is created from each of said discharge stations, through said flow control means and to said at least one coating dispenser.

30. The apparatus of claim 29 in which said means for connecting said source of flushing fluid comprises:

a circulation shuttle having a discharge station connected to said source of flushing fluid and a filling station connected to each of said first and second discharge lines;

actuator means for moving said filling station of said circulation shuttle in and out of coupling engagement with said discharge station thereof;

a flush switch connected to said actuator means, said flush switch being effective to cause said actuator means to move said filling station into coupling engagement with said discharge station to create a continuous flow path from said source of flushing fluid, through said circulation shuttle to said flow control means and then to said at least one coating dispenser.

31. The apparatus of claim 30 in which said actuator means includes a linear actuator connected to said filing station, and a switch for operating said linear actuator.

32. The apparatus of claim 28 in which said flushing fluid is water, air, or, water and air.

33. The apparatus of claim 28 in which said flushing means includes dump means, connected to each of said first and second shuttles, for moving each of said first and second shuttles into coupling engagement with their respective filling stations so that flushing fluid is transmitted into said reservoir of each of said first and second pumps, through said filling stations and back to said source of flushing fluid.

34. The apparatus of claim 28 in which said flushing means includes pump agitation means for alternately introducing a flushing fluid into said reservoir of each of said first and second pumps from said source of flushing fluid so that said piston therein moves in a first direction, and for then causing said pistons to move in an opposite, second direction to force the flushing fluid from said first and second pumps, through said discharge stations, through said flow control means and back to said source of flushing fluid.

35. The apparatus of claim 27 in which each of said first and second pumps has a piston movable within said reservoir thereof, said apparatus further comprising pump agitation means for introducing a flushing liquid into said reservoir of each of said first and second pumps so that said piston therein moves in a first direction, and for then causing said pistons to move in an opposite, second direction to force the flushing liquid from said reservoir of said first and second pumps.

36. The apparatus of claim 35 in which each of said first and second transfer units includes a linear actuator which is effective to move said shuttles associated therewith between said filling station and said discharge station:

said pump agitation means includes:

(i) a first switch connected to a source of pressurized air;

(ii) a pressure regulator connected to said switch to receive pressurized air therefrom and to discharge a stream of reduced pressure air; and (iii) a control valve associated with each of said first and second transfer units, each of said control valves being connected to said pressure regulator, to said linear actuator associated with their respective first and second transfer units, and to one of said first and second pumps, each of said control valves being effective in response to receipt of said stream of reduced pressure air from said pressure regulator to operate one of said linear actuation such that said first and second shuttles are moved into coupling engagement with their respective discharge stations, and such control valves being effective to move said piston within each of said first and second piston pumps in a first direction;

a switch associated with each of said first and second piston pumps, each of said switches being operative in response to movement of said pistons to a predetermined location in said first direction to operate said linear actuators so that said first and second shuttles are moved into coupling engagement with their respective filling stations to permit the transmission of flushing liquid into said reservoirs of said first and second pumps.

37. The apparatus of claim 36 in which said circulation means includes:

a circulation shuttle having a discharge station connected to the source of coating material, and a filling station connected to said flow control means; and actuator means for moving said filling station of said circulation shuttle in and out of coupling engagement with said discharge station.

38. The apparatus of claim 27 further including pump emptying means for moving each of said first and second shuttles into coupling engagement with their respective discharge stations so that coating material contained within said reservoir of each of said first and second pumps is transmitted through said flow control means without supplying new coating material to either of said first and second pumps.

39. The apparatus of claim 38 in which each of first and second transfer units includes:

a linear actuator which is effective to move said shuttle associated therewith between said filling station and said discharge station; and an actuator valve which controls the operation of said linear actuators;

said pump emptying means including a switch operative to produce a signal, whereby each of said actuator valves is effective upon receipt of said signal to cause said linear actuators of their associated first and second transfer units to move said shuttles to said discharge stations.

40. The apparatus of claim 27 in which said filling station is connected by a supply line and by a return line to the source of coating material, said apparatus further including dump means for moving each of said first and second shuttles into coupling engagement with their respective filling stations so that coating material contained within said reservoir of each of said first and second pumps is transmitted to said filling stations and through said return line to the source of coating material.

41. The apparatus of claim 40 in which each of said first and second transfer units includes a linear actuator which is effective to move said shuttles associated therewith between said filling station and said discharge station, and wherein said dump means comprises a switch operative to produce a signal which operates each of said linear actuators to move their respective shuttles into coupling engagement with said discharge stations of said first and second transfer units.

42. The apparatus of claim 27 in which said flow control means includes a sync valve having a valve body formed with a central bore connected to an outlet which is adapted to communicate with said at least one coating dispenser, a first inlet connected to said central bore and to said discharge station of said first transfer unit, a second inlet connected to said central bore and to said discharge station of said second transfer unit, a first valve carried within said first inlet and movable between an open and closed position relative to the intersection of said first inlet and said central bore, and a second valve carried within said second inlet and movable between an open and closed position relative to the intersection of said second inlet and said central bore.

43. Apparatus for transmitting electrically conductive coating material to at least one electrostatic coating dispenser, comprising:

first and second pumps each having a reservoir formed with an inlet and an outlet;

a first transfer unit for supplying coating material to said first pump, said first transfer unit including:

(i) a filling station connected to a source of coating material;

(ii) a discharge station spaced from said filling station; and (iii) a first shuttle releasably couplable to said filling station and to said discharge station, said shuttle being connected to said inlet and to said outlet of said first pump;

a second transfer unit for supplying coating material to said second pump, (i) a filling station connected to the source of coating material;

(ii) a discharge station spaced from said filling station; and (iii) a second shuttle releasably couplable to said filling station and to said discharge station, said second shuttle being connected to said inlet and to said outlet of said second pump;

filling control means, associated with each of said first and second transfer means, for moving said shuttle of each of said first and second transfer means to their respective filling stations in response to depletion of coating material from said reservoir of said first and second pumps, respectively;

discharge control means, associated with each of said first and second transfer means, for moving said shuttle of each of said first and second transfer means to their respective discharge stations in response to filling of said reservoir of said first and second pumps, respectively, with coating material;

flow control means, connected to said discharge station of each of said first and second transfer means and to at least one coating dispenser, for sequentially transmitting coating material to the coating dispenser from said reservoir of said first pump through said discharge station of said first transfer means, and then to the coating dispenser from said reservoir of said second pump through said discharge station of said second transfer means.

44. The apparatus of claim 43 in which each of first and second transfer units includes a linear actuator which is effective to move said shuttles associated therewith between said filling station and said discharge station, and an actuator valve which controls the operation of said linear actuators.

45. The apparatus of claim 44 in which said filling control means of each of said first and second transfer units includes a second sensor operative to produce a second signal in response to movement of said piston to said retracted, depleted position, said actuator valve being operative in response to receipt of said second-signal to activate said linear actuator so that said shuttle moves to said filling station.

46. The apparatus of claim 45 further including a control valve operatively connected to said second sensor of each of said first and second transfer units and to said flow control means, said control valve being effective in response to receipt of said second signal from said second sensor of one of said first and second transfer units to operate said flow control means such that flow of coating material from said reservoir of one of said pumps to the coating dispenser is terminated while flow of coating material from said reservoir of the other of said pumps to the coating dispenser is initiated.

47. The apparatus of claim 44 in which said first and second pumps each include a piston movable within said reservoir thereof between and extended, filled position and a retracted, depleted position, said discharge control means of each of said first and second transfer units including a first sensor operative to produce a first signal in response to movement of said piston to said extended position, said actuator valve being operative in response to receipt of said first signal produced by said first sensor to actuate said linear actuator so that said shuttle moves to said discharge station.

48. Apparatus for supplying electrically conductive coating material, comprising:

a first reservoir and a second reservoir each adapted to connect to a source of electrically conductive coating material;

flow control means for connecting said first and second reservoirs to at least one coating dispenser;

means for alternatively transmitting coating material from said first reservoir and from said second reservoir through said flow control means to the coating dispenser for discharge onto a substrate;

means for charging the coating material discharged from the coating dispenser;

first means movable to a first position for electrically isolating said first reservoir from the source of electrically conductive coating material when said first reservoir is receiving coating material from the source, and second means movable to a second position for electrically isolating said second reservoir from the source of electrically conductive coating material when said second reservoir is receiving coating material from the source.

49. The system of claim 48 wherein said first and second reservoirs have upper limit indicating means and lower limit indicating means for controlling the transfer of coating material therein.

50. The system of claim 49 wherein when said upper limit means of the first reservoir is triggered, coating material flow is shut off, and when said lower limit means of the first reservoir is triggered, said flow control means shifts the supply of paint to the coating dispenser from the first reservoir to the second reservoir.

51. The apparatus of claim 48 further including means for circulating the coating material to and from the source of electrically conductive coating material when said at least one coating dispenser is not operating.

52. Apparatus for transmitting electrically conductive coating material to at least one electrostatic coating dispenser, comprising:

first a second pumps each having a reservoir formed with an inlet and an outlet;

a first transfer unit for supplying coating material to said first pump, said first transfer unit including:

(i) a filling station connected to a source of coating material;

(ii) a discharge station spaced from said filling station; and (iii) a first shuttle releasably couplable to said filling station and to said discharge station, said shuttle being connected to said inlet and to said outlet of said first pump;

a second transfer unit for supplying coating material to said second pump, said second transfer unit including:

(i) a filling station connected to the source of coating material;

(ii) a discharge station spaced from said filling station; and (iii) a second shuttle releasably couplable to said filling station and to said discharge station, said second shuttle being connected to said inlet and to said outlet of said second pump;

flow control means, connected to said discharge station of each of said first and second transfer units and to a coating dispenser, for sequentially supplying coating material from said first pump and then from said second pump to said coating dispenser for deposition onto a substrate;

circulation means for circulating coating material from the source of coating material, through each of said first and second transfer units, and back to said source, when said coating dispenser is not dispensing coating material.

53. Apparatus for supplying electrically conductive coating material to at least one coating dispenser, comprising:

a color changer connected to at least one coating dispenser;

a number of parallel, voltage block systems each connected to said color changer and to separate source of electrically conductive coating material, each of said voltage block systems including:

(i) a first reservoir and a second reservoir each adapted to connect to a source of electrically conductive coating material;

(ii) flow control means for connecting said first and second reservoirs to at least one coating dispenser;

(iii) means for alternatively transmitting coating material from said first reservoir and said second reservoir through said flow control means to the coating dispenser for discharge onto a substrate;

(iv) means for charging the coating material discharged from the coating dispenser; and (v) means for electrically isolating said first reservoir from the source of electrically conductive coating material when said first reservoir is supplying coating material through said flow control means to the coating dispenser, and means for electrically isolating said second reservoir from the source of electrically conductive coating material when said second reservoir is supplying coating material through said flow control means to the coating dispenser.

*54. A system for supplying electrically conductive material from a source to at least one electrostatic coating dispenser comprising:*

*a power supply for electrically charging the coating material;*

*a pump; and*

*a movable transfer unit having a filling position connecting the source to said pump to fill said pump with coating material while simultaneously creating a voltage block between said pump and the dispenser, and a discharge position connecting said pump to the dispenser to permit the flow of coating material from said pump to the dispenser while simultaneously creating a voltage block between the source and said pump.*

*55. The system of claim 54 in which said pump is a first pump and said movable transfer unit is a first movable transfer unit, said system further including:*

*a second pump;*

*a second movable transfer unit having a filling position connecting the source to said second pump to fill said second pump with coating material while simultaneously creating a voltage block between said second pump and the dispenser, and a discharge position*

*connecting said second pump to the dispenser to permit the flow of coating material from said second pump to the dispenser while simultaneously creating a voltage block between the source and said second pump; and*

*a flow control device associated with said first and second movable transfer units, said flow control device being operative to sequentially shift the flow of coating material from one of said first pump and said second pump to the other.*

*56. A method for supplying electrically conductive material to at least one electrostatic coating dispenser comprising:*

*applying high voltage to the conductive coating material;*

*selectively directing coating material from a supply through a movable transfer unit in a filling position to a pump while utilizing the movable transfer unit in the filling position for both blocking flow of the conductive material from the pump to the dispenser and creating a voltage block therebetween; and*

*selectively directing the coating material from the pump through the movable transfer unit in a discharge position to the dispenser while utilizing the transfer unit in the discharge position for both blocking flow of the conductive material from the supply to the pump and creating a voltage block therebetween.*

*57. The method of claim 56 further comprising the steps of:*

*selectively directing coating material from a supply through a second movable transfer unit in a filling position to a second pump while utilizing the movable transfer unit in the filling position for both blocking flow of the conductive material from the second pump to the dispenser and creating a voltage block therebetween;*

*selectively directing the coating material from the second pump through the second movable transfer unit in a discharge position to the dispenser while utilizing the transfer unit in the discharge position for both blocking flow of the conductive material from the supply to the second pump and creating a voltage block therebetween; and*

*controlling the operation of the movable transfer units so that flow of coating material can be shifted from said pump and said second pump to said dispenser.*

*58. The method of claim 57 further including the steps of:*

*sequentially shifting the flow of coating material from said pump and said second pump through a flow control device to the dispenser; and*

*controlling the operation of the movable transfer units and the flow control device so that both said movable transfer unit and said second movable transfer unit are located at their discharge positions at the same time to permit an overlap in the flow of coating material from said pump and said second pump to said dispenser during the shifting of flow from one of said pump and said second pump to the other.*

*59. A system for supplying electrically conductive coating material from a supply to at least one dispenser, comprising:*

*a first flow path and a second flow path each having an inlet adapted to be connected to the source of coating material, an outlet, and, a pump for receiving coating material from said inlet and delivering coating material to said outlet;*

*a voltage block device associated with each of said first and second flow paths, said voltage block device being movable to a filling position at which coating material passes to said pump while a voltage block is created between said pump and the dispenser, said voltage block device being movable to a discharge position at which coating material passes from said pump to the dispenser while a voltage block is created between the supply and said pump;*

*a flow control device associated with each of said first and second flow paths, said flow control device being operative to sequentially shift the flow of coating material from one of said first and second flow paths to the other while maintaining a substantially uninterrupted flow of coating material to the dispenser.*

*60. The apparatus of claim 59 in which said flow control device includes a synchronizing valve comprising a synchronizing valve body having a first inlet connected by a line to said outlet of said first flow path, a second inlet connected by a line to said outlet of said second flow path, an outlet internally connected to each of said first and second inlets and being adapted to connect to at least one dispenser, and, a first valve and a second valve for selectively closing and opening said first and second inlets.*

*61. The apparatus of claim 60 further including a control system connected to said first and second valves of said synchronizing valve and operative in response to material levels in each of said pumps, said control system being effective to open one of said first and second valves while the other of said first and second valves is still closing to have an overlap in flow through said synchronizing valve from both pumps, whereby a substantially uninterrupted flow of coating material through said synchronizing valve to at least one dispenser can be maintained.*

*62. The apparatus of claim 59 wherein said substantially uninterrupted flow is maintained by said flow control device permitting flow from both of said pumps through said flow control device simultaneously for a period of time during the shift from one flow path to the other.*

*63. The apparatus of claim 62 wherein said flow control device includes a first valve communicating with said outlet of said first flow path, and a second valve communicating with said outlet of said second flow path, said flow control device permitting said first and second valves to be simultaneously open for said period of time.*

*64. A method for supplying electrically conductive coating material to at least one coating dispenser comprising:*

*transferring coating material from a supply through a first transfer unit which is located in a filling position to a first reservoir and through a second movable transfer unit which is located in a filling position to a second reservoir while electrically isolating the first and second reservoirs from the coating dispenser;*

*transferring the coating material from said first and second reservoirs through said first and second movable transfer units which are located in discharge positions to a flow control means while electrically isolating the first and second reservoirs from said supply;*

*alternately transferring the coating material through said flow control means to the coating dispenser from said first reservoir and from said second reservoir while providing an overlap in flow from both reservoirs during changeover from one to the other;*

*moving said first transfer unit to the discharge position at which the first transfer unit is operative both to electrically isolate said first reservoir from said supply and to block flow therebetween while coating material is*

*being transferred from said first reservoir through said flow control means to the coating dispenser, and then moving the first transfer unit to the filling position at which the first transfer unit is operative both to electrically isolate said coating dispenser from said first reservoir and to block flow therebetween while coating material is being transferred from said supply to said first reservoir;*

*moving said second transfer unit to the discharge position which is operative both to electrically isolate said second reservoir from said supply and to block flow therebetween while said coating material is being transferred from said second reservoir through said flow control means to the coating dispenser, and then moving the second transfer unit to a filling position at which the second transfer unit is operative both to electrically isolate said coating dispenser from said second reservoir and to block flow therebetween while coating material is being transferred from said supply to said second reservoir; and*

*electrically charging the coating material sprayed from the coating dispenser.*

*65. A method for supplying electrically conductive coating material to at least one coating dispenser comprising:*

*transferring coating material from a supply through a first transfer unit to a first reservoir to fill said first reservoir to a high level while electrically isolating the first reservoir from the coating dispenser;*

*when said first reservoir is filled to said high level, connecting said first reservoir to a flow control valve and operating said flow control valve to transfer coating material from said first reservoir to the coating dispenser while electrically isolating the first reservoir from the supply;*

*transferring coating material from the supply through a second transfer unit to a second reservoir to fill said second reservoir to a high level while electrically isolating the second reservoir from the coating dispenser;*

*when said second reservoir is filled to said high level connecting said second reservoir to said flow control valve while coating material is still being transferred to the flow control valve from the first reservoir;*

*when said coating material in said first reservoir reaches a low level, operating said flow control valve to transfer coating material simultaneously from said first reservoir and said second reservoir to the coating dispenser while electrically isolating said first and second reservoirs from the supply thereby simultaneously transferring coating material through said flow control means to the coating dispenser from both said first reservoir and said second reservoir while both of said reservoirs are isolated from said supply;*

*terminating the flow of coating material through said flow control means to the coating dispenser from said first reservoir while maintaining the flow of coating material through said flow control means to the coating dispenser from said second reservoir;*

*transferring coating material from the supply through the first transfer unit to the first reservoir to fill said first reservoir to said high level while electrically isolating said first reservoir from the coating dispenser; and*

*when said first reservoir is filled to said high level connecting said first reservoir to said flow control valve so that said first reservoir is ready to supply coating material through said flow control valve to said dispenser when the coating material in said second reservoir reaches said low level.*

*66. The method of claim 65 wherein the flow control valve comprises a first valve communicating with the first reservoir and a second valve communicating with the second reservoir, and wherein said first and second valves are simultaneously open for a period of time while coating material is being simultaneously transferred from said first and second reservoirs to said dispenser.*

*67. The method of claim 65 wherein at least a part of the period of time when said first and second valves are simultaneously open occurs while said first valve is opening and said second valve is closing, and while said second valve is opening and said first valve is closing.*

* * * * *